United States Patent [19]

Deck

[11] Patent Number: 4,864,515

[45] Date of Patent: Sep. 5, 1989

[54] ELECTRONIC SENSING SCREEN FOR MEASURING PROJECTILE PARAMETERS

[75] Inventor: Leslie L. Deck, Eden Prairie, Minn.

[73] Assignee: Honeywell Inc., Minneapolis, Minn.

[21] Appl. No.: 31,951

[22] Filed: Mar. 30, 1987

[51] Int. Cl.[4] ............................. G01P 3/68; G01P 3/36
[52] U.S. Cl. .................................... 364/516; 364/565;
356/4; 356/28; 250/553; 250/222.2
[58] Field of Search ................. 356/4, 5, 28, 285, 141;
324/178; 364/516, 561, 565, 900; 250/553, 203 R, 222.2, 225

[56] References Cited

U.S. PATENT DOCUMENTS

| | | | |
|---|---|---|---|
| 4,097,800 | 6/1978 | Kuchmus, Sr. et al. | 250/222.2 |
| 4,185,191 | 1/1980 | Stauffer | 250/204 |
| 4,230,942 | 10/1980 | Stauffer | 250/204 |
| 4,272,189 | 6/1981 | Baley et al. | 250/225 |
| 4,313,109 | 1/1982 | Funk et al. | 250/553 |
| 4,317,991 | 3/1982 | Stauffer | 250/201 |
| 4,329,060 | 5/1982 | Wilder | 250/203 R |
| 4,410,804 | 10/1983 | Stauffer | 250/578 |
| 4,425,501 | 1/1984 | Stauffer | 250/216 |

FOREIGN PATENT DOCUMENTS 8505187  11/1985  PCT Int'l Appl. .................. 356/28

*Primary Examiner*—Parshotam S. Lall
*Assistant Examiner*—Ellis B. Ramirez
*Attorney, Agent, or Firm*—John G. Shudy, Jr.

[57] ABSTRACT

A unique electronic sensing screen apparatus for automatically measuring various parameters of moving projectiles. Projectiles pass between an artificial or natural light source and light sensors, resulting in signals from the sensors, which are processed into data showing projectile profiles or photo-like images, shock waves, velocity, angle of attack, and dispersion. The apparatus provides quick turn-around times between parameter measurements, such as those of many projectiles fired in rapid succession, and readily usable results.

35 Claims, 16 Drawing Sheets

ELECTRONIC SENSING SCREEN FOR MEASURING PROJECTILE PARAMETERS

BACKGROUND OF THE INVENTION

The present invention relates generally to an apparatus for measurement of projectile ballistics, and, more particularly, is concerned with quick, automatic and simultaneous measurements of speed, dispersion, attack angle and shape of projectiles without interfering with the projectiles' trajectories.

Conventional measurements of various flight characteristics of projectiles such as pitch, yaw and dispersion involve high-speed photography, such as flash X-ray and Schlerin photography, and cardboard yaw screens. Each approach has its disadvantages. Although high-speed photography may give a useful visual representation of a projectile in flight, data reduction is tedious and turnaround time is slow. Further, the cost of attaining this data is high for a large number of projectiles.

The cardboard yaw screen approach involves examining a cardboard pierced by projectiles for determining projectiles' pitch, yaw, and dispersion. Determination of pitch and yaw is accomplished by measuring with a template the ellipticity of the hole formed by the projectile—a time consuming and coarse measurement. The cardboard or like material is limited in the number of projectiles that it may accept and the technique may interfere with the projectiles' flight.

The present invention obviates the disadvantages of the prior art and offers surprising new advantages over the prior art.

SUMMARY OF THE INVENTION

The present invention utilizes several light sensitive arrays which are illuminated by artificial or natural radiation, such as lasers or sunlight. The radiation is sensed in the form of several thin flat grids lying in parallel planes, each sensing radiation from different directions. The sensors are arrays of radiation-sensitive cells which are electronically interrogated at a high rate. The passage of projectiles between the light source and the arrays occludes the radiation to specific cells in accordance with the projectile profiles. These interruptions of sensed radiation by the cells are recorded and computed into parameters of the passing projectiles.

One advantage of the present invention over the prior art is that it quickly, automatically and simultaneously measures speed, attack angle, shape, shock waves and dispersion of projectiles. The invention is suitable for either small or large projectiles, depending upon the embodiment of the invention utilized.

Another advantage of the invention is that the cost per parameter is low. The measurements neither interfere with projectiles' flights nor require modifications to the projectiles. Large amounts of reliable and accurate data may be obtained over the whole projectile trajectories. The invention requires little dependence on externally supplied data. Still another object of the invention is that data reduction and turn-around time is fast making the invention suitable for automated "scoring" systems for taking data on a large series of projectiles fired at a high rate. The output of the invention is in a digital data format for easy transfer to computers for data reduction and analysis. Also, the invention is self-triggering upon the firing of the projectile and the projectile's entry into the sensing area of the invention.

DETAILED DESCRIPTION OF THE PREFERRED EMBODIMENTS

Figure 1:
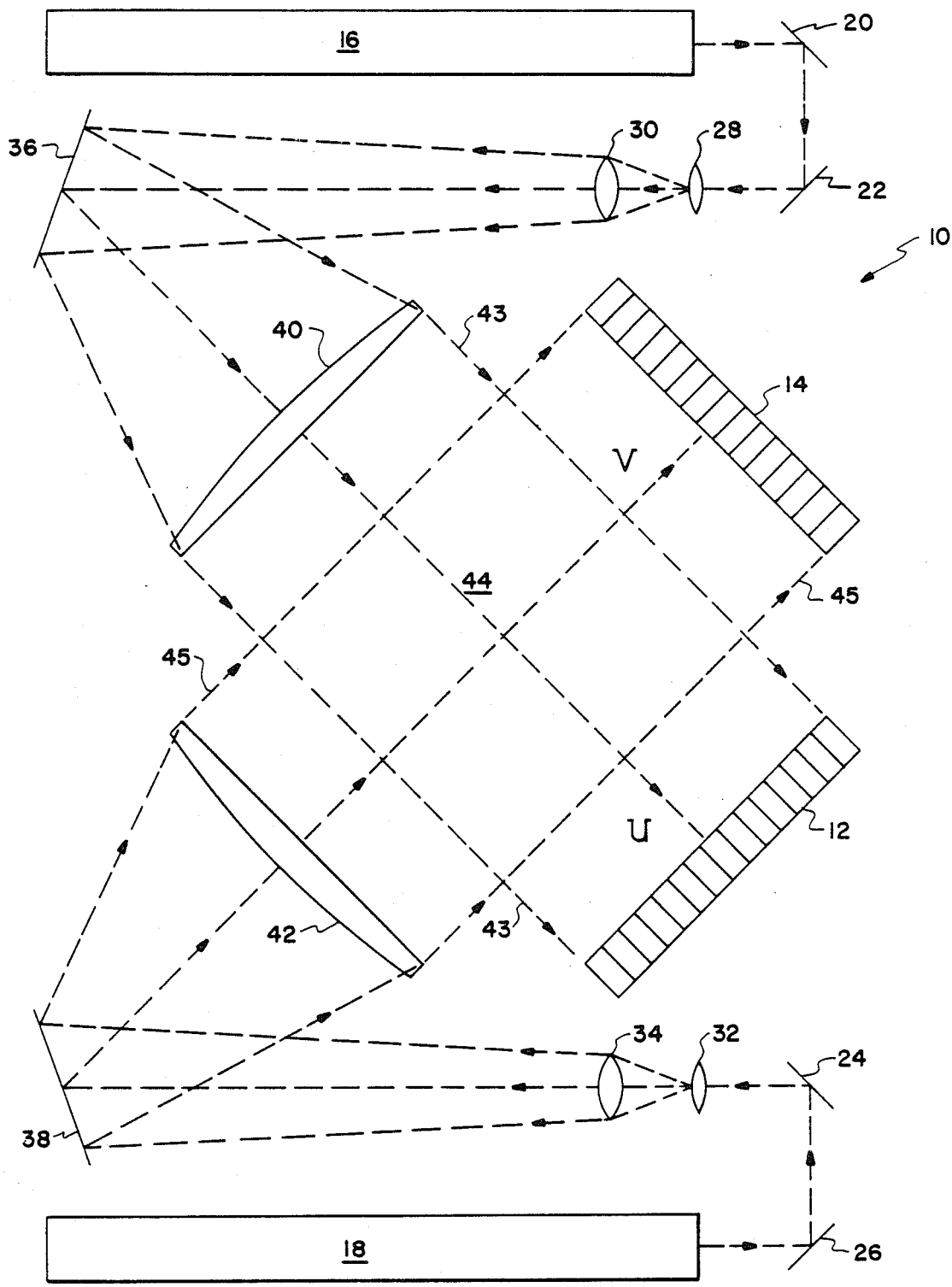
FIG. 1 shows a sensing screen through which projectiles pass.

FIG. 1 shows an embodiment of an electronic sensing screen 10 for detecting and taking data on projectiles which enter an active area plane 44, perpendicular to the plane 44. Lasers 16 and 18 may be five milliwatt or greater, single mode, linearly polarized, continuous wave HeNe lasers operating at 632.8 nanometers. However, the type of laser utilized is not critical. Solid state lasers or other types of light may be used. Lasers 16 and 18 emit laser beams which are deflected by reflective mirrors 20 and 22, 26 and 24, through expanding optics 28 and 30, 32 and 34, respectively. Expanded beams are deflected by reflective mirrors 36 and 38 to large cylindrical lens 40 and 42, respectively. Reflective mirrors 20, 22, 24, 26, 36 and 38 are not necessary. They are added for containment purposes. The lasers and optical lens alone are sufficient.

Each large cylindrical lens, 40 and 42, is about 8 inches wide and about 1 inch thick. Lens 40 and 42 are spherical in one direction and collimate the beams into planes of light 43 and 45, parallel to each other. Laser beam planes 43 and 45 may be referred to the U and V planes, respectively. Laser beam planes 43 and 45 overlap each other with the beam directions approximately orthogonal to each other. The overlap is area 44. Laser beam planes 43 and 45 impinge upon photodiode arrays 12 and 14, respectively composing the two-dimensional sensing screen or active area 44. Each photodiode array, 12 and 14, has 128 cells and measures instantaneous illuminesence. One type of photodiode array which may be used is model number ADC 3050, from Advanced Detector Corporation. The number of photodiode cells may be more or less as needed.

In operation, a projectile enters through active area region 44 perpendicular to the planes 43 and 45, of the expanded laser beams. The projectile occludes light in the directions of photodiode arrays 12 and 14. Portions of arrays 12 and 14, indicate the lack of light, and such information is processed by the system and stored in memory 56 of FIG. 2, the contents of which provide an indication of the various parameters of the observed projectile.

At launch, an external start signal (IGN) is supplied to the electronic sensing screen. The observed time between launch and when the device is triggered (when it first detects the projectile passing through the chamber active area) is automatically saved. This allows the time between successive triggering of separate devices to be simply calculated. The fast trigger signal (TRIG) consists of a simultaneous "low" on two adjacent photocells on both planes. This criterion should be stringent enough to eliminate false triggering due to electrical transients. After gun launch, the device starts taking data and filling temporary buffer which stores the last several microseconds of data. The number of microseconds of stored data is variable; for example it may be 1, 2, 4, 8, 16, etc., microseconds. After triggering, the data from this buffer, as well as all subsequent data, are stored in a high-speed memory. This continues until the memory is full. Afterwards, the ∓data ready" signal is sent to the external microcomputer to initiate data retrieval and start analysis.

Figure 2:
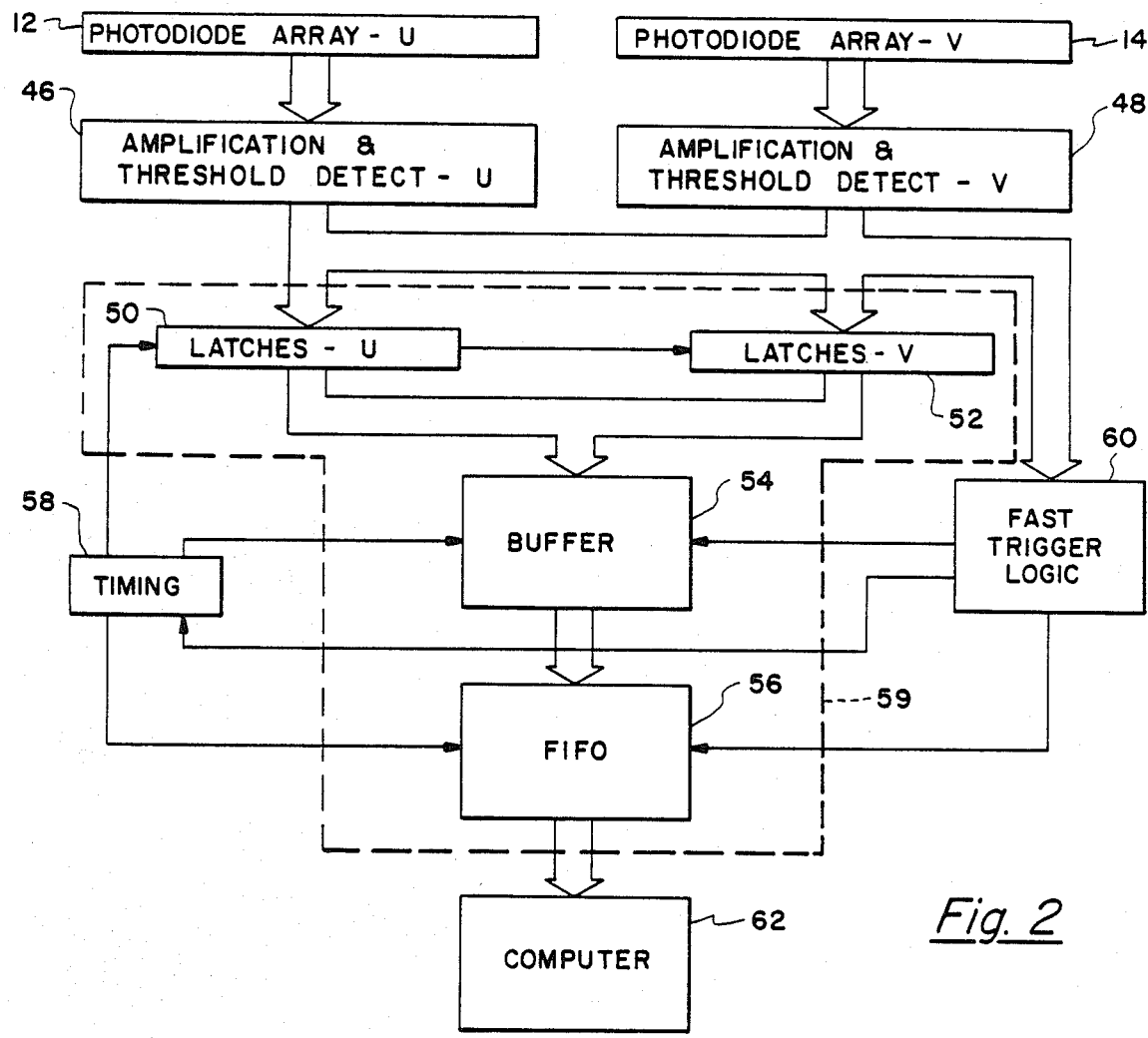
FIG. 2 is a block diagram of the electronics.
Figure 3:
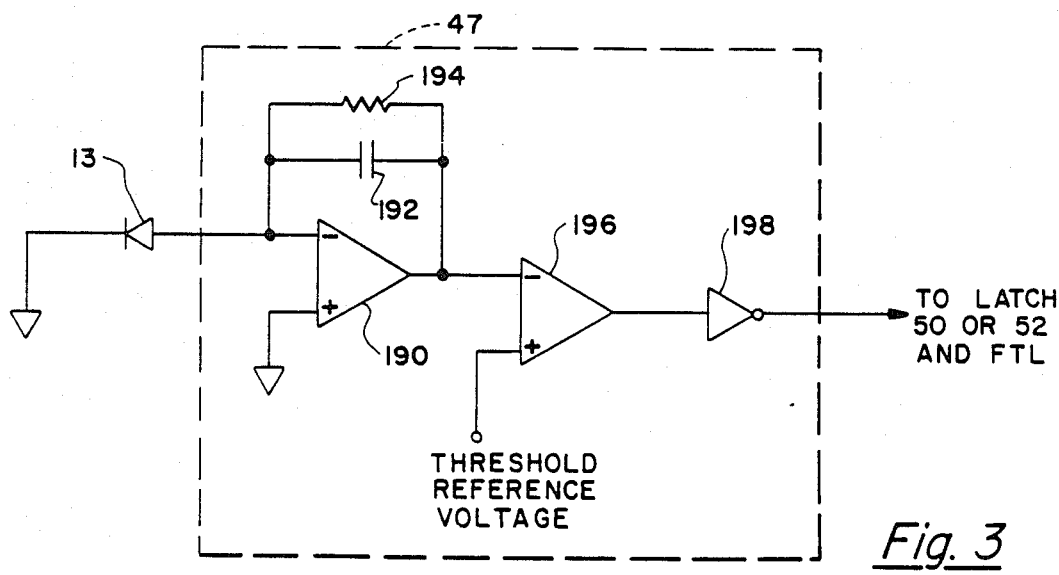
FIG. 3 is a schematic of an amplification and detection circuit.

FIG. 2 shows a block diagram of the invention. The outputs of photodiode arrays 12 and 14 enter the amplification and threshold detection circuits 46 and 48. The amplification and threshold detection circuit, 46 or 48, has a number of specific circuits 47, one for each photodiode output, as illustrated in FIG. 3. The output of photodiode 13 of photodiode array, 12 or 14, goes to the inverting input of an operational amplifier 190. The noninverting input of amplifier 190 is grounded. The feedback loop of amplifier 190 has a capacitor 192 of about 5 picofarads and a resistor 194 which may be adjusted for the desired gain or amplification of amplifier 190. Amplifier 190 may be an integrated circuit LM318. The output of amplifier 190 goes to the inverting input of a comparator 196, which may be an integrated circuit MC3430. The noninverting input of comparator 196 is connected to a threshold reference voltage. When the voltage output level of amplifier 190 crosses the value of the threshold reference voltage, then comparator 196 exhibits a signal which goes to an inverting buffer 198. The output of buffer 198 goes to latches 50 or 52, and fast trigger logic 60.

The outputs for each plane, U and V, viz., laser beam planes 43 and 45, from the amplification and threshold detectors 46 and 48, enter latches 50 and 52, respectively. The output of latches 50 and 52, which involve 128 signals per plane, enter buffer 54 and go on to the first-in-first-out (FIFO) memory 56. FIFO 56 is a high-speed memory which may be an IDT 7M204-65 from Integrated Device Technology of Santa Clara, Calif. Data from FIFO 56 are sent to computer 62 for data reduction and analysis.

Timing block 58 provides a clock signal to latches 50 and 52, buffer 54 and FIFO 56. Fast trigger logic 60 receives inputs from amplification and threshold detect circuits 46 and 48. A fast trigger logic 60 signal indicates light being blocked on any two adjacent photodiode cells in arrays 12 and 14 for planes U and V, respectively. The fast trigger logic signal goes to buffer 54 and a memory enable from fast trigger logic 60 goes to FIFO 56. These signals indicate that a projectile has entered active area 44 of FIG. 1 and initiates timing apparatus 58. The fast trigger logic signal causes data from buffer 54 to be recorded into FIFO 56. Buffer 54 and FIFO 56 may be incorporated as one unit.

Figure 4:
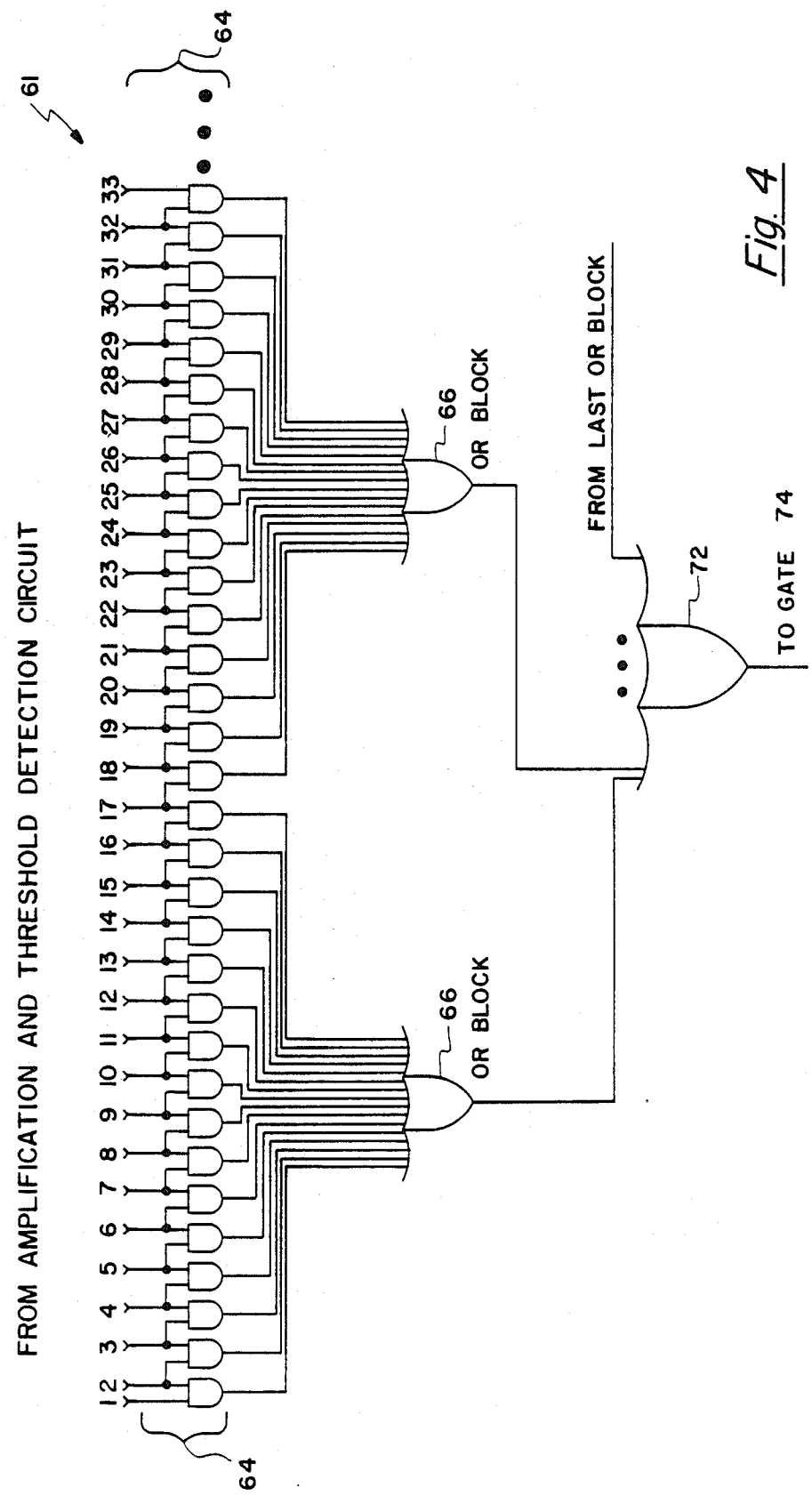
FIG. 4 is a schematic of a fast trigger logic circuit.

FIG. 4 shows an example of the logic 61 of the fast trigger logic 60 for each plane. This example is for a 33-input plane. One logic 61 is utilized for the U plane and another logic 61 is utilized for the V plane. The fast trigger logic 60 receives its inputs from amplification and threshold detection circuits 46 and 48. The logic 61 in FIG. 4 is easily expandable to 128 or more photodiode outputs per plane.

In the operation of the fast trigger logic 60, the inputs of AND gates 64 are normally low. The normally low outputs of AND gates 64 are input into a set of sixteen input OR gates 66. The normally low outputs of OR gates 66 are input into another sixteen-input OR gate 72. The normally low output of OR gate 72 represents the output of the logic 61 for either the U or the V plane. The AND/OR gates may utilize PAL 16CI integrated circuits.

To obtain a fast trigger logic 60 signal (TRIG), the light impinging the photodiodes must be obstructed from at least two adjacent photodiodes in each of the two planes 43 and 45, U and V. For instance, in FIG. 4, if two adjacent photodiodes, connected through the amplification and threshold detection circuit 46 or 48, are obstructed from the incoming light, then, for example, the second and third inputs to AND gates 64 at the left of logic 61 in FIG. 4 will go high. If so, that means that at least one input of OR gate 66 is high thus causing the normally low output of that OR gate 66 to go high. The high output of gate 66 goes to an OR gate 72 causing the latter output to become high.

In order to double the number of inputs of logic 61, one can take two of these logic 61 circuits and connect their respective outputs to another OR gate. This process may be repeated as many times as needed to attain a sufficient number of inputs desired for logic 61.

Figure 5:
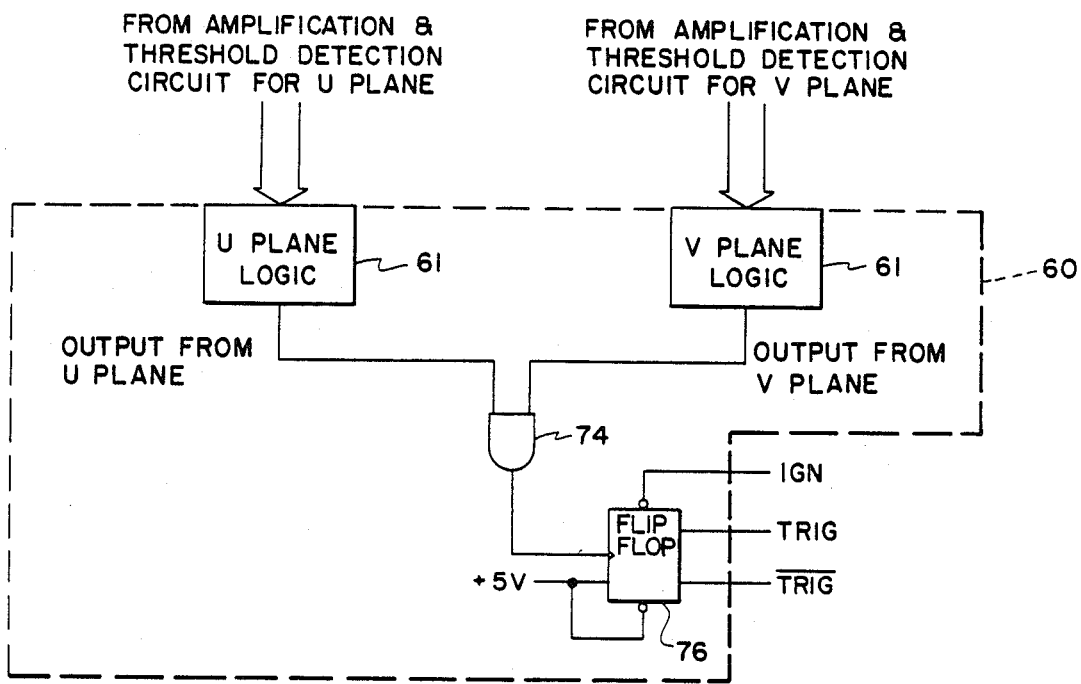
FIG. 5 is a schematic of a logic circuit which combines the fast trigger logic outputs of the two planes.

FIG. 5 is the end-part of the fast trigger logic 60 which combines the logic circuit 61 outputs for planes U and V. A two-input AND gate 74 receives the output from the U plane logic 61 and the output from the V plane logic 61. Both inputs to AND gate 74 are normally low and the gate 74 output is normally low. Both the output of logic 61 for the U plane and the output of logic 61 for the V plane must be high for the output of AND gate 74 to go high. The high output of gate 74 indicates that light has been blocked to at least two adjacent photodiodes in the U plane and two adjacent photodiodes in the V plane.

The output of AND gate 74 goes to the clock input of flip-flop 76, indicating that a projectile has entered the active area 44 of the electronic sensing screen 10. The clear input to flip-flop 76 is the ignition (IGN) signal indicating that the projectile has been fired. Trigger outputs of flip-flop 76 indicate the projectile has been fired and that the projectile has entered the active area 44.

Logic 61 may be designed in a variety of suitable to the desires of the designed or user. The number of photodiodes required to be blocked in either plane may be other than two. Also, the logic 61 may be designed so as not to require a signal from both planes top indicate presence of a projectile of in the active area 44.

Figure 6:
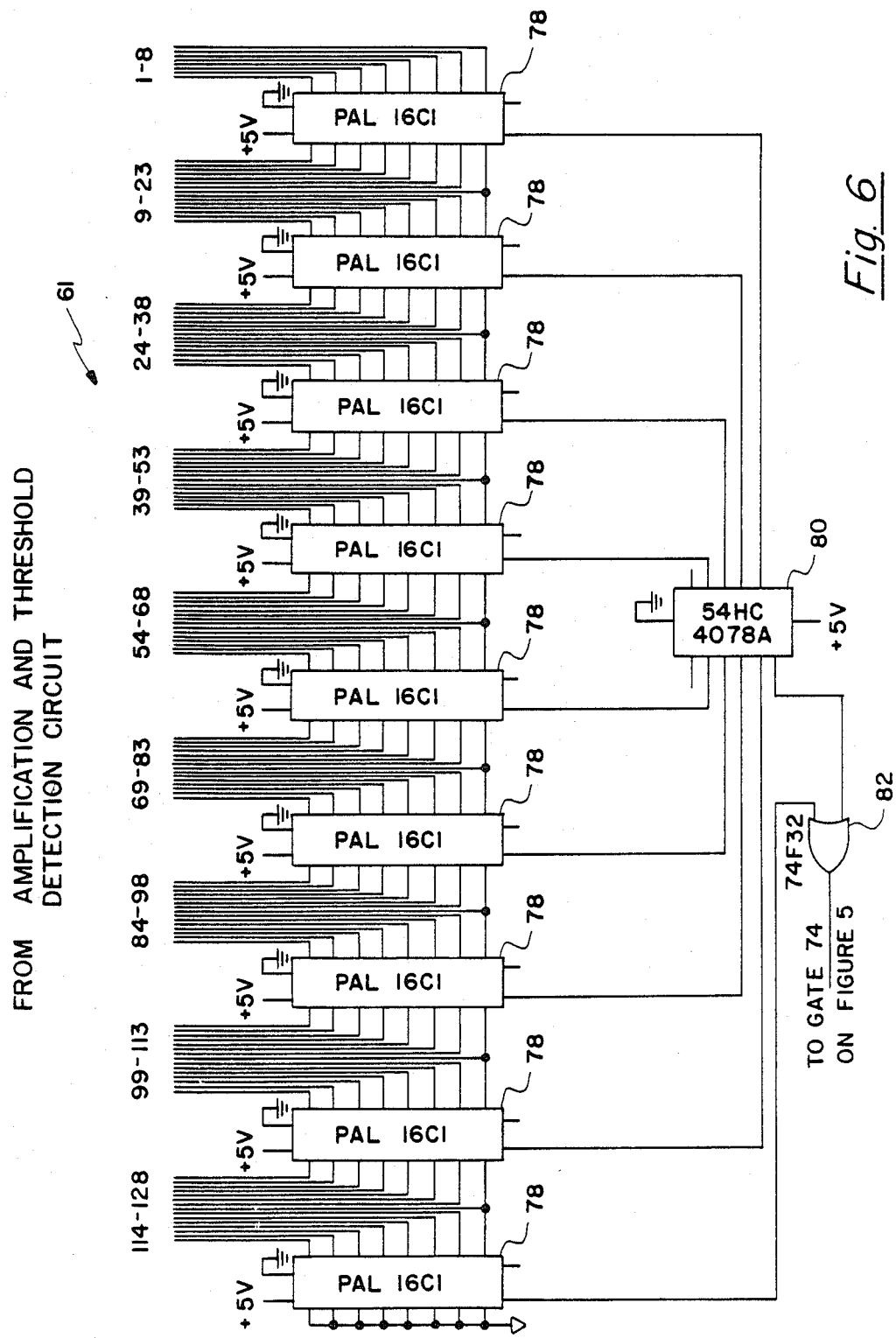
FIG. 6 is a schematic of another fast trigger logic circuit.

The present invention is not restricted to a particular logic 61. For example, FIG. 6 shows an alternative to the circuitry of FIG. 4 for the logic 61 of the fast trigger logic 60. The logic 61 in FIG. 4 is different from the logic 61 in FIG. 6 in that the former accommodates 33 inputs, whereas the logic 61 in FIG. 6 accommodates 128 inputs utilizes different integrated circuits 78. The basic logic schematic of these integrated circuits 78 in FIG. 6 may be essentially the same as that in FIG. 4. Any other workable logic scheme is appropriate. Signals from the amplification and threshold detection circuits 46 and 48 are provided to the fast trigger logic circuitry 61 of FIG. 6, similarly as that of FIG. 4. For instance, the outputs of amplification and threshold detection circuit 46 are input into the circuitry 61 of FIG. 6 for the U plane and the outputs of amplification and threshold detection circuit 48 are input into the circuitry 61 of FIG. 6 for the V plane.

Integrated circuits 78 are programmable array logic integrated circuits type PAL 16Cl. The PAL 16Cl is an AND gate array having inputs into an OR gate. This programmable array circuit 78 may be configured for the desired AND/OR connections reflecting various kinds of logic, including that of FIG. 4. The outputs of integrated circuits 78 are input into an eight-input OR gate integrated circuit 80. The output of OR gate 80 is input into a two-input OR gate 82. The other input of OR gate 82 is for accommodating a ninth programmable array logic integrated circuit 78 which allows the circuit 61 to accept 128 inputs from one of the amplification and threshold detection circuits, 46 or 48. The output of OR gate 82 is equivalent to the output of OR gate 72 in FIG. 4. The circuitry of FIG. 6 is an alternative to the circuitry of FIG. 4. The output of logic 61 of FIG. 6 for each plane, U and V, is input into AND gate 74 of FIG. 5.

Figure 7:
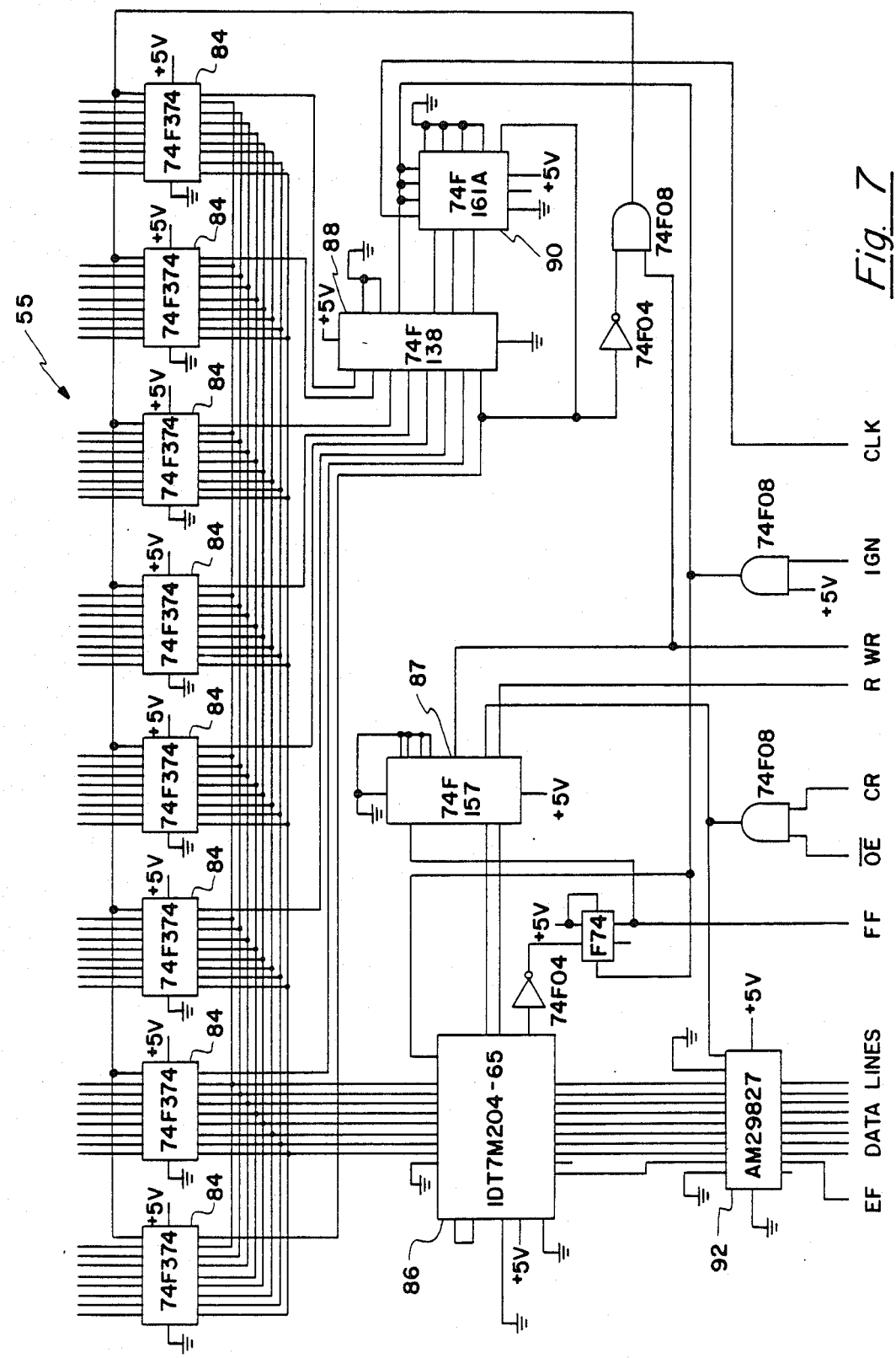
FIG. 7 is a schematic of one of four identical circuits which together form the data acquisition system.

FIG. 7 is a schematic of one of the four circuits 55 which together form the data acquisition system 59. Each circuit 55 is identical so that only on will be discussed in detail. Outputs of the amplification and threshold detection circuits 46 and 48 are connected to these four circuits 55. The first such circuit 55 is connected to the odd photodiode signal outputs as conditioned by the amplification and threshold detection circuit 46 for the U plane. The second circuit 55 has its inputs connected to the even photodiode outputs a conditioned by the amplification and threshold detection circuit 46 for the U plane. The third such circuit 55 has its inputs connected to the odd photodiode outputs as conditioned by the amplification and threshold detection circuit 48 for the V plane. The fourth circuit 55 has its inputs connected to the even photodiode outputs as the conditioned by the amplification and threshold detection circuit 48 for the V plane.

The conditioned photodiode signals initially enter into latches 84 of the data acquisition system 59 circuits 55 in FIG. 7. There are 16 latches 84 in the latches block 50 of FIG. 2 for the U plane and 16 latches 84 in latches block 52 of FIG. 2 for the V plane.

In circuit 55 of FIG. 7, the signals in each of the eight latches 84, are taken out separately, upon receipt of a high signal from demultiplexer 88. Demultiplexer 88 sequentially takes data from each of the eight latches 84 and inputs it into the 4K-byte FIFO 86 at a rate of 8 MHz, i.e., approximately 125 nanoseconds per latch 84. The demultiplexer 88 is cycled by counter 90, which receives an 8 MHz clock signal. After the eight latches 84 are cycled through and data are taken from them, then the latches are simultaneously enabled to receive another set of data from the amplification and threshold detection circuits 46 and 48. The data are again transferred from the latches 84 into FIFO 86 and so on. The latches 84 are sequentially written to the FIFO 86 with the read line (R) set high (disabled) until an amount of data equal to the pretrigger setting (determined in support electronics 102) has been accumulated, whereupon the read line (R) and write line (WR) are simultaneously toggled. In this manner the FIFO 86 always retains a small queue containing the most recent data. When the projectile is sensed, the FTL signal forces the support electronics 102 to hold the read line (R) high (disabled), the write line (WR) is not affected. Data is then written to the FIFO 86 until filled, whereupon the full flag (FF) signal generated by FIFO 86 simultaneously toggles multiplexer 87 and sends a signal to computer 62 indicating data is ready to send. After the full flag (FF) is received by multiplexer 87, the write (WR) line is held high (disabled) and the line which controls FIFO 86 read pin is switched from read (R) to computer read (CR). After a full flag (FF) signal goes to the computer 62, then FIFO 86 receives from the computer 62 an output enable (OE) signal and a computer read (CR) signal which toggles the data out of the FIFO 86 through buffer 92 out along data lines to the computer. Read (R) and write (WR) signals originate at timing circuit 58 of FIG. 2.

Figure 8:
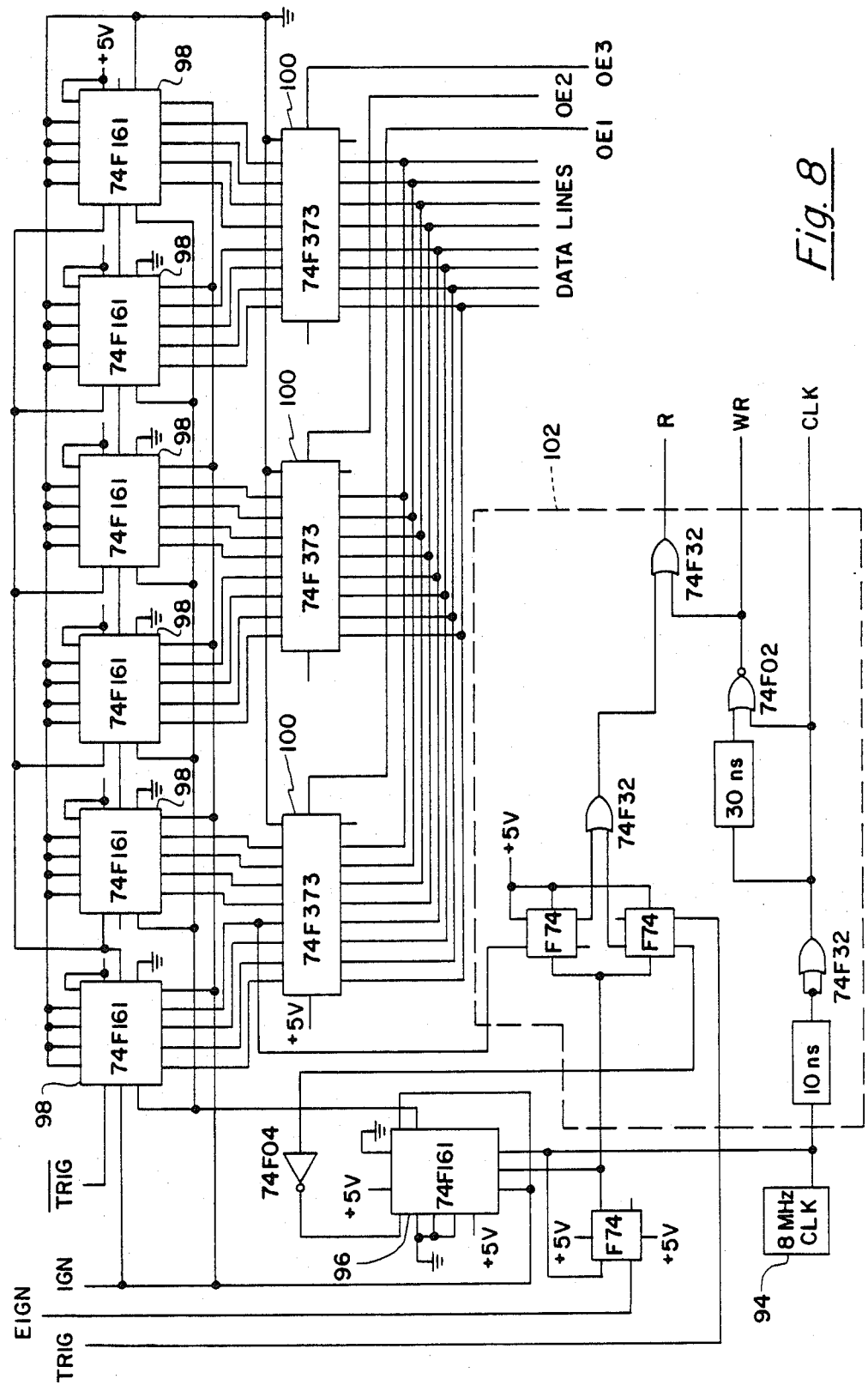
FIG. 8 shows the logic of a timing circuit.

FIG. 8 shows the timing circuit 58. Clock 94 runs at 8 MHz and is the basis for the timing of the electronic sensing screen 10 system. The clock may be designed to operate at other frequencies, such as a lower one for testing slower projectiles. One output of clock 94 goes to a divide-by-eight counter 96, which in turn, outputs a 1 MHz clock signal to six four-bit timers 98. The four-bit timers 98 are connected in series and count increments of time from ignition (IGN) i.e., when a projectile is fired, to the time when the electronic screen device 10 sees something in its active field of view 44. Timing signals from each of the three sets of four-bit timers go into buffers 100. The outputs of buffers 100 are tied in to a set of data lines which go the computer. These data lines are common to the data lines from the four circuits 55 of FIG. 7 for data acquisition system 59. The computer does a selection with output enable signals (OE1, OE2 and OE3) when it desires data from one of the three timing buffers 100 in FIG. 8. When the computer wants to select data on the data lines from one of four circuits 55 as represented by FIG. 7, it will do so by toggling one of the output enable signals ($\overline{OE}$) in FIG. 7 for one of the respective four circuits 55 of the data acquisition system 59. Only one of the output enable lines is toggled at a time for data. Each enable output line is sequentially toggled so that the computer can get all sets of data separately. When data is received down the data lines from one of the three buffers 100 or from one of the four data acquisition circuits 55, all of the other sets of data lines outputs go to a state of high impedance. Support electronics 102 in FIG. 8 provide read (R), write (WR) and clock (CLK) signals to the data acquisition circuits 55.

Figure 9:
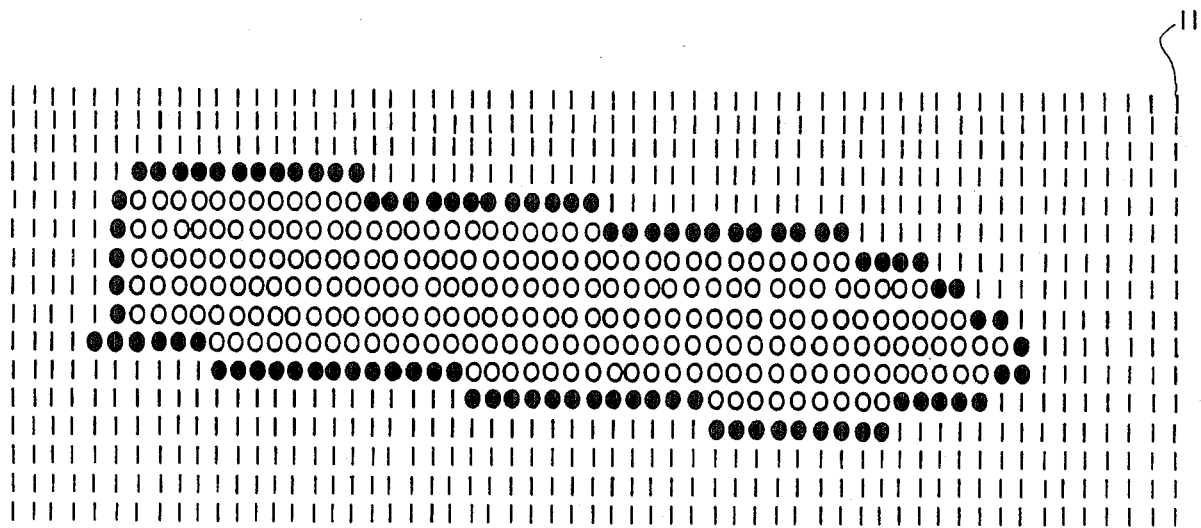
FIG. 9 is a printout of processed data of a simulated small projectile test.

FIG. 9 shows a representative graphic display of processed data from the electronic sensing screen device 10 for a tested projectile. A display 11 shows a particular projectile recognizable by its profile as it passed through one of the planes. For the same projectile, display 11 can show another profile of the projectile in a plane orthogonal to the first plane. Also, angle of attack can be deciphered from these profiles.

Speeds of projectiles of interest might run up to 10,000 feet per second or 3 millimeters per microsecond. Thus, the photocell response and sampling rate must be high enough to ensure data-taking capability during the short time that the projectile is in the chamber active area 44. This is achieved at a sampling rate of 1 MHz. At this rate, a five inch projectile travelling at 10,000 feet per second will generate 42 "time slices" of data. Such a data rate exceeds the capability of most microcomputers. Thus, the data obtained are temporarily stored in small amount of fast memory resident in the electronic sensing screen 10. The data are transferred to the microcomputer for analysis after the event.

Figure 10:
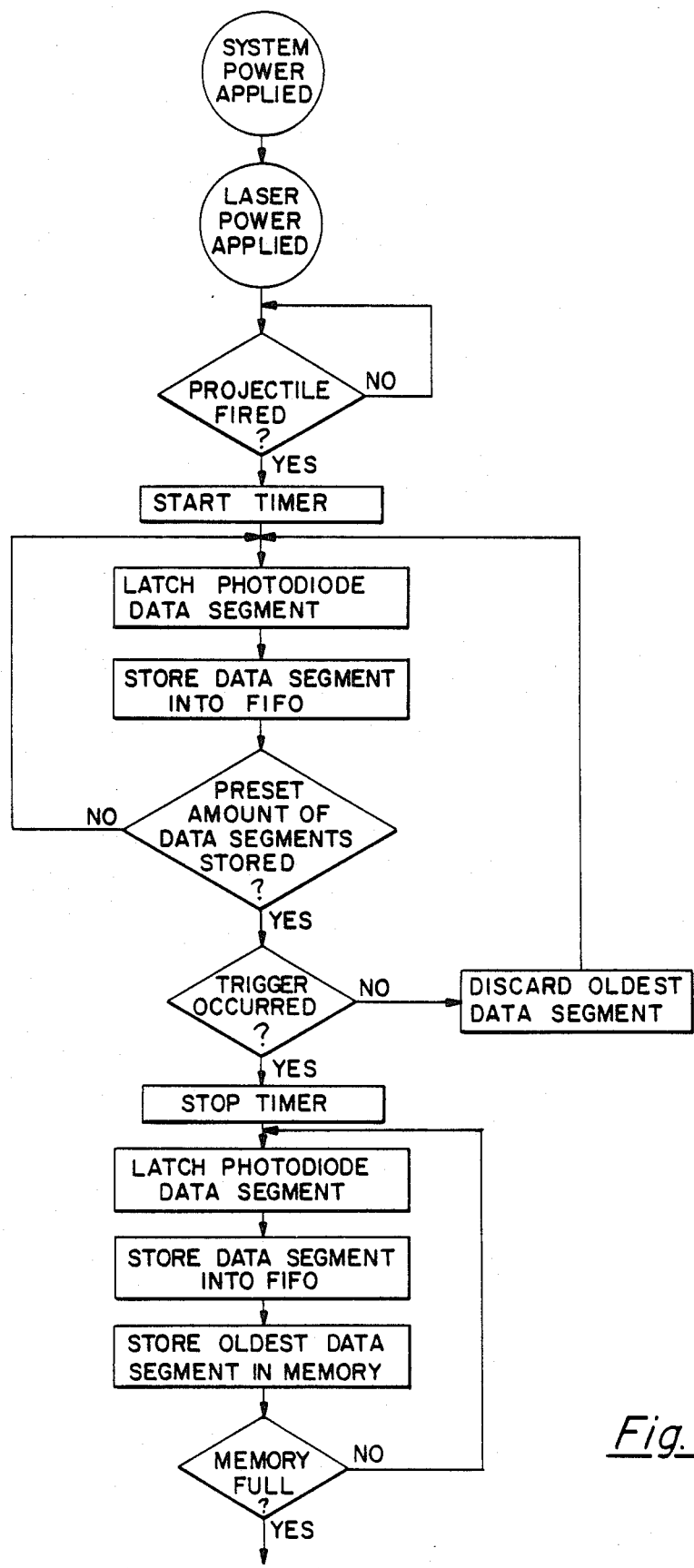
FIG. 10 shows a sequence of events for obtaining data in a projectile test.
Figure 11:
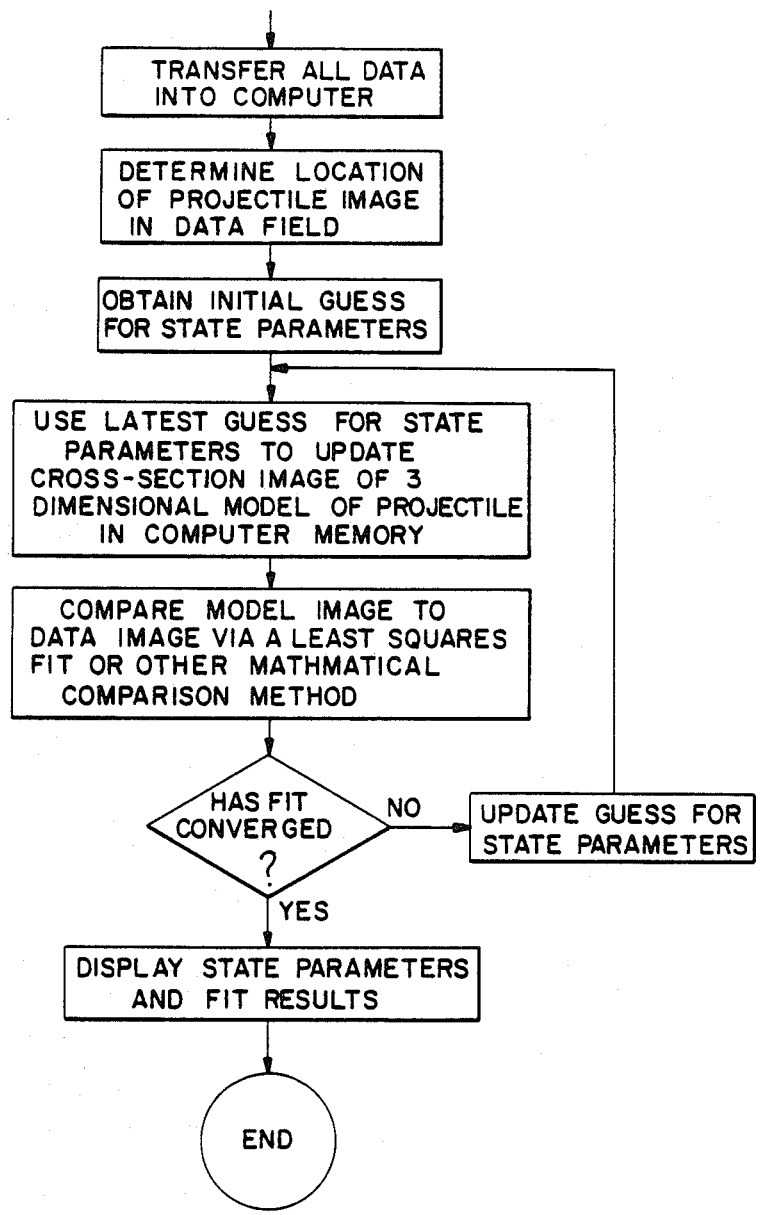
FIG. 11 shows a sequence of events for analyzing data of a projectile test.

A sequence of events of the electronic sensing screen 10 apparatus is shown in a flow diagram in FIG. 10. That flow diagram begins with "system power applied" and ends with a "memory full". FIG. 11 is a flow diagram that is continuation of the flow diagram in FIG. 10. However, the flow diagram of FIG. 11 shows the sequence of events after the data leaves the memory of the electronic sensing screen 10, i.e., events outside the electronic sensing screen 10 apparatus. The flow diagram in FIG. 11 notes the processing steps of data after transfer from the memory of the electronic sensing screen 10 apparatus.

The steps of the invention as shown by FIG. 10 begin with applying power to the system and lasers, in that order. The system logic continually ask itself the question whether a projectile has been fired for test, until the answer to the question is yes. At the latter point, the timer is started. Then a photodiode data segment is latched and stored into the FIFO memory. The ensuing question is whether there is a preset amount of data segments stored. If not, another photodiode data segment is latched. If so, then the question is whether a trigger occurred. If not, then the oldest photodiode data segment is discarded and another photodiode segment is latched and stored in the FIFO memory. If a trigger has occurred, then the timer is stopped. Next, another photodiode data segment is latched and stored in the FIFO memory. The oldest data segment is stored in the memory. After such memory storage, the question is whether the memory is full. If not, another photodiode segment is latched. This memory question continues to be asked until the memory is full.

FIG. 11 shows the steps of the test when the memory is deemed full as indicated at the bottom of FIG. 10. A full memory of data is transferred into a computer. The computer determines the location of the projectile image in the data field and then makes an initial guess for state parameters. That guess of those parameters is used to portray a cross-section image of a three-dimensional model of the tested projectile. The model is stored in the computer's memory. Next, the model image is compared with the data image via a "least squares" fit or another mathematical comparison method. After such comparison, there is the question whether the fit of the comparison has converged. If the answer is no, then the latest guess for state parameters is used to update the cross-section image of the three-dimensional model of the projectile in the computer memory. The model image is compared to the data image via the "least squares" fit or other mathematical comparison method and then the question whether the fit has converged, is reasked. If the answer is yes, then the state parameters and fit results are displayed. That display is the end of the data analysis.

Figure 12:
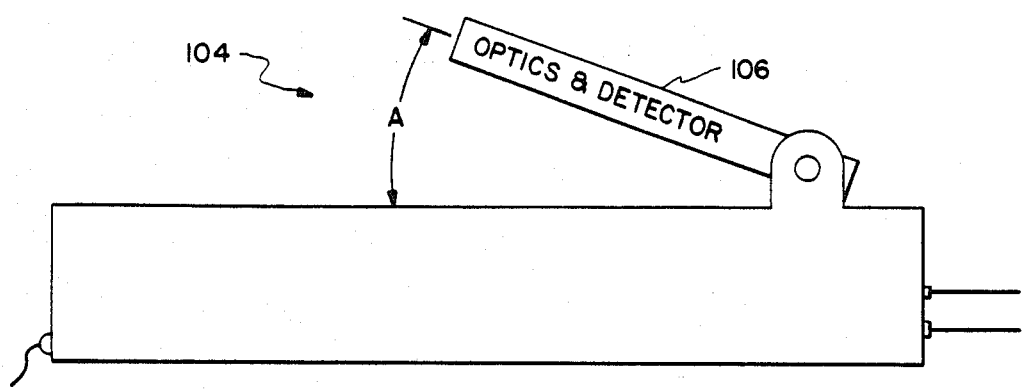
FIG. 12 shows another embodiment of the present invention.

The above described embodiment 10 is suitable for measuring small caliber projectiles. Small caliber projectiles are fast and may be contained to small areas for measurement. Large caliber projectiles, on the other hand, are slower and require a larger area for operational testing. Thus, a practicable place for measuring large projectiles is outdoors utilizing natural radiation from the sky. The latter is achieved by an embodiment 104 of FIG. 12 as described below.

The major components of embodiment 104 for large active areas major components for systems blocks include: an optical and detector assembly 106; the data acquisition electronics; and the fast trigger logic. Various modifications to the basic components can be made to enhance a particular feature such as resolution, cost, or complexity. However, the basic function and logic of the data acquisition electronics will not change any of the basic functions described herein, except perhaps as to the specifics of interfacing the data acquisition electronics to the detector system selected. Similarly, the optical assembly must fulfill certain basic functions for successful device operation, but specific details such as how to interface the optics to the detector depend on the detector choice and may entail minor modifications to the optics to account for detector size, intensity requirements, etc. Thus, the choice of detector assembly will most affect device operation and its applicability to specific projectile test scenarios. Three types of detector concepts are presented here, each having different characteristics which may make one concept preferable to a particular kind of testing.

The CCD concept is one of the cheapest and easiest detector concepts to implement. A high speed CCD line scanning photodiode array such as the CCPD RL1288D by EG&G has the speed and sensitivity under adequate light conditions. However, under low light conditions, the photodiode array's integration time may have to be extended to assure sufficient accumulation of light. If this integration time becomes too long then insufficient data on the projectile will be obtained by the time the projectile leaves the active area. In some configurations, image intensifiers may solve this problem.

Another photodiode concept is a direct extension of the small earlier design. Light from the optical assembly is focused on a custom built photocell array and each cell is individually coupled to amplification and threshold detection electronics. The outputs of the threshold detection circuit are directly fed to fast trigger logic and the data acquisition electronics whose architecture is the same as the first embodiment described.

A fiber optics concept uses optical fibers to couple light from a screen upon which a projectile image is focused, to individual PIN photodiodes. The photodiode outputs can be coupled to very sensitive amplifiers to achieve low light sensing characteristics for the electronic sensing screen system.

Embodiment 104 for measuring large caliber projectiles may utilize the same electronics as described above in the embodiment 10 for measuring small caliber projectiles. However, an alternative set of electronics is described here for embodiment 104.

FIGS. 12 through 19 illustrate embodiment 104 of the invention. The optics and detector 106 sense natural radiation, such as from the sun, and any occlusion of that radiation by a projectile is detected by optics and detector assembly 106 and transfered electronically to the electronics of embodiment 104. The optics and detector 106 can be elevated at angle A, as desired relative to the horizontal, for looking at a projectile.

Figure 13:
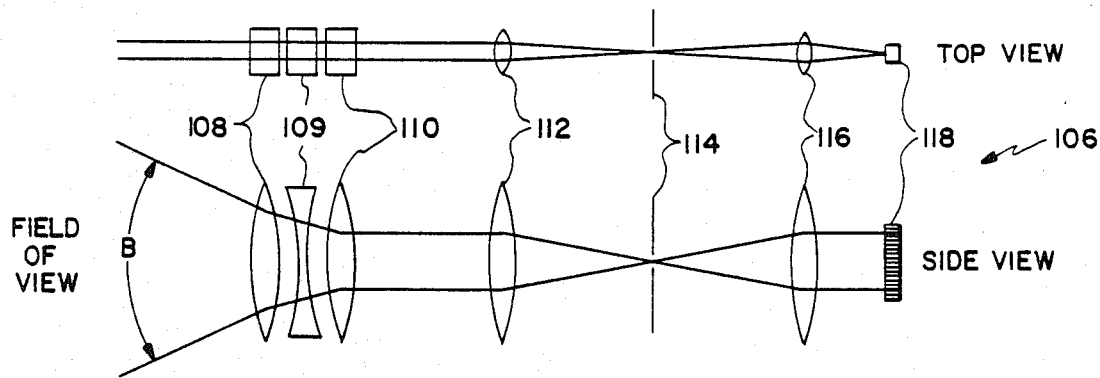
FIG. 13 shows an optics and detector assembly.

FIG. 13 shows an example of the optics and detector assembly 106 used to cover a field of view and to focus the light of the view on a photocell detector 118. Lenses 108 and 110 are cylindrical lenses, that is, they are ground and shaped in one dimension only. The field of view from the top view of optical assembly 106 is about 1 centimeter wide and extends indefinitely at that width. The field of view from the side view varies with an adjustable opening angle B. Lenses 108 and 110 may be moved relative to each other so as to change the opening angle B. Light is deflected in one dimension, i.e., in the vertical dimension but not in the horizontal dimension. Lenses 112 and 116 focus the light range through the pin hole aperture 114 onto the photocell array 118. The optics and detector assembly 106 may be modified with additional, less or different optics. Also, filters may be used as desired. The optics 106 compose a high quality assembly which is corrected for as many aberrations as possible to achieve optimum focus at the pinhole aperture 114. This high quality correction is necessary for the collimation properties of the optical assembly to be as high as practicable.

Photocell (CCD) array 118 may be a model number RL1288D, available from EG&E Reticon of Sunnyvale, Calif. This photocell array and its built-in associated electronics are described in the manufacturer's specifications on the RL1288D, which are incorporated herein by reference thereto. The associated electronics may include shift registers, capacitors, sample-and holds, gates, etc. The array is an ultra-high speed, soft-scan, charge-coupled, linear photodiode array with video output taps for every 128 diodes. This array has eight sections with 1024 diode resolution. It has a wide spectral response from near ultra-violet to near infrared. Each block of 128 pixels has two shift registers for readout, one for odd numbered pixels within a section (odd video channel) and the other for even numbered pixels within a section (even video channel). Thus, photodiode array 118 has sixteen CCD analog shift registers and the same number of video output lines.

Light incident on the sensing aperture of array 118 generates photocurrent which is integrated and stored as a charge on the capacitance of each of the photodiodes. At the end of each integration period, the charges on all of the diodes are simultaneously switched through transfer gates into CCD analog shift registers for readout. Immediately after this parallel transfer, a new integration period begins. The integration periods and charge or signal transfers are controlled by clock signals from a 100 KHz integration clock 124 and an 8 MHz shift register clock 122 in FIG. 15.

Figure 14:
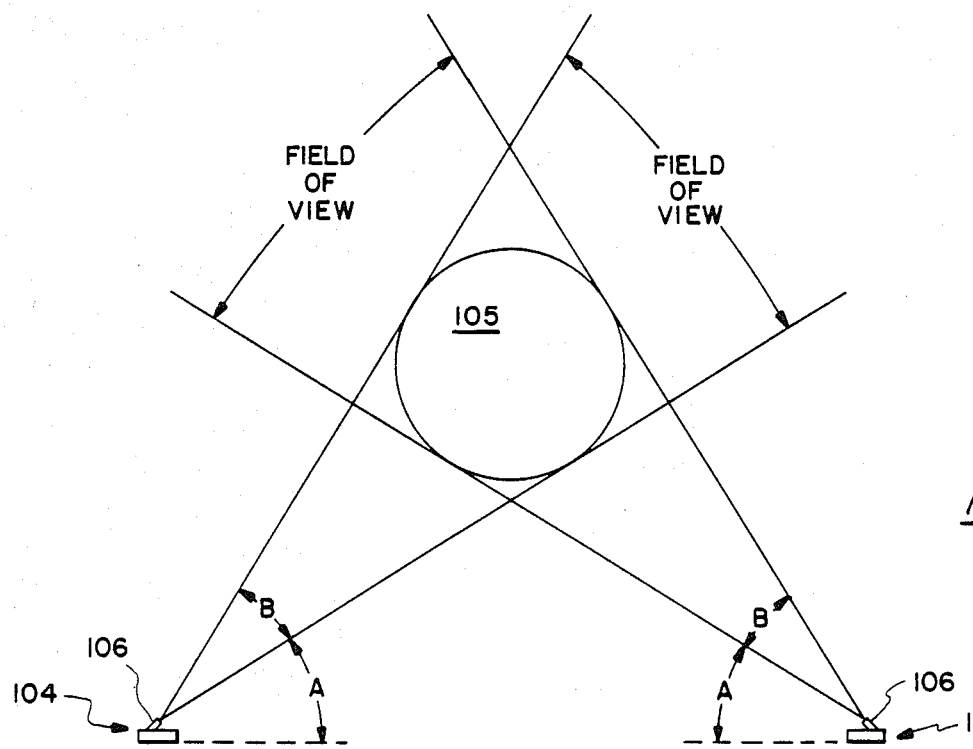
FIG. 14 shows a sensing screen of a second embodiment of the present invention.

FIG. 14 shows the spatial position of the electronic sensing screen 104 optics and detector 106 set-ups relative to the active area 105 through which a projectile passes for parameter measurement. FIG. 14 shows the shape of the field of view of two detector 106 systems, which is the preferred arrangement. The overlap of the two fields of view constitutes active area 105, similar to the active area 44 of FIG. 1. Use of only one electronic sensing screen 104 allows measurements of the speed, dispersion and the orientation of the projectile in the plane perpendicular to the optical axes. The error in the dispersion would thus be greater because the distance of the projectile from the optics would have to be estimated from the projectiles' apparent magnification on the output data as displayed in FIG. 19. The fan-like shape of the field of view means that the measurement resolution depends upon the opening angle B chosen and the distance between the projectile and the optics. If, for a fixed opening angle B, a projectile is brought closer to the optics, the finer resolution is at the expense of a smaller active area 105. As an example of the resolution expected from the device, adjusting the field of view to create a 1256 square foot active area (i.e., a 40 foot diameter circle) achieves an average cell size of less than 0.25 square inches.

The optical opening angle B, may be adjusted between 5°-10° and the detector elevation angle A can be adjusted as desired. This latitude makes it easy to accommodate a large number of active area and target height combinations. An active area may vary from the equivalent of a 40 foot diameter circle, 300 hundred feet off the ground to a 3.5 foot diameter circle, twenty feet off the ground. However, ultimately, the distance between the optics and the projectile (slant-range) is limited by the collimation properties of optics 106.

Figure 15:
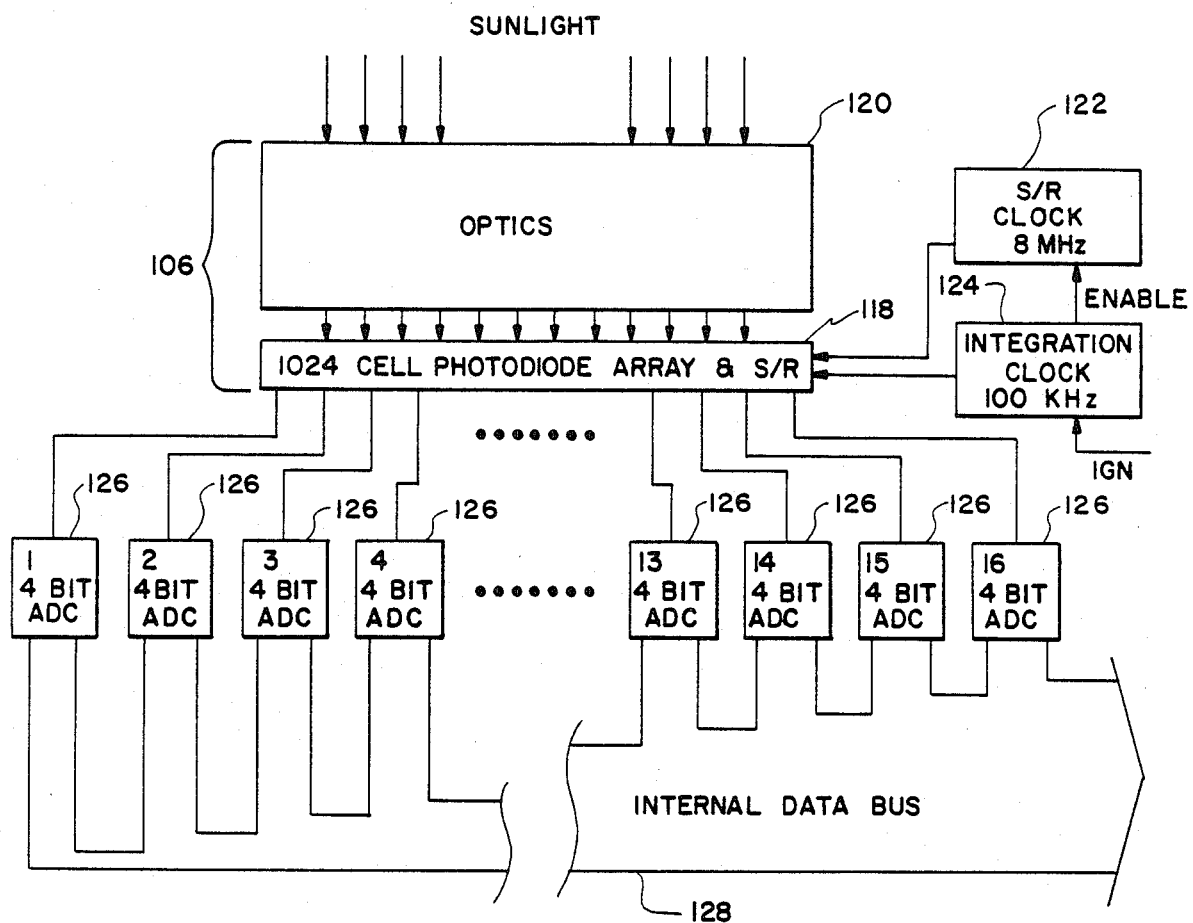
FIG. 15 is a block diagram of the analog electronics of a detector assembly.

FIG. 15 is a functional block diagram of the analog electronics. The optics and detector assembly 106 in FIG. 15, is described in the above discussion of FIG. 13. A 100 KHz integration clock 124 initiated by the ignition (IGN) signal, determines integration time, i.e., photodiode cell exposure time. When light strikes a photodiode cell, the cell discharges a capacitor which is precharged to a certain level. Every 10 microseconds the contents of the capacitor pertaining to the respective photodiode cell are dumped into an analog shift register via a sample-and-hold type circuit which transfers the contents or samples the contents.

This system may be used on either cloudy or sunny days. However, on some cloudy days, longer integration times may be necessary if the ambient light levels are not sufficiently high enough to saturate the photodiode cells before the integration time is expended. With longer integration times, the data dump from each photocell would be more infrequent and thus the system slower which may be yet satisfactory for slow moving projectiles. If the times of integration are not sufficient then not all photodiodes will saturate thus resulting in a signal indicating a shade rather than "black on white". The presently described embodiment may functionally provide discrete "black or white" indications or indications of various shades of grey.

The data from the 1024 photodiode cell capacitors are simultaneously put into 16 analog shift registers. The 16 shift registers' data are serially and simultaneously clocked out by an 8 MHz clock 122. Clock 122 is enabled by clock 124. Clock 122 allows the whole array to be read in 8 microseconds. The data are fed into 16 four-bit analog-to-digital converters 126 in FIG. 15. For each bit of information from a photodiode cell analog shift register, an analog-to-digital converter 126 creates a four-bit word. This improvisation is in place to accommodate various shades of information from each photodiode as desired. Output of the analog-to-digital converter 126 may be either a four-bit word of all zeros, a four-bit word of all ones or a mixture of ones and zeros for various shades. The four-bit words from the sixteen analog-to-digital converters 126 go into an internal data bus 128 of 64 bits, i.e., 16 four-bit words in parallel. From the analog-to-digital converters 126, the data, via the internal data bus 128, go on to the data acquisition system 130 of FIG. 16, and to the fast trigger logic 132 of FIG. 18.

Figure 16:
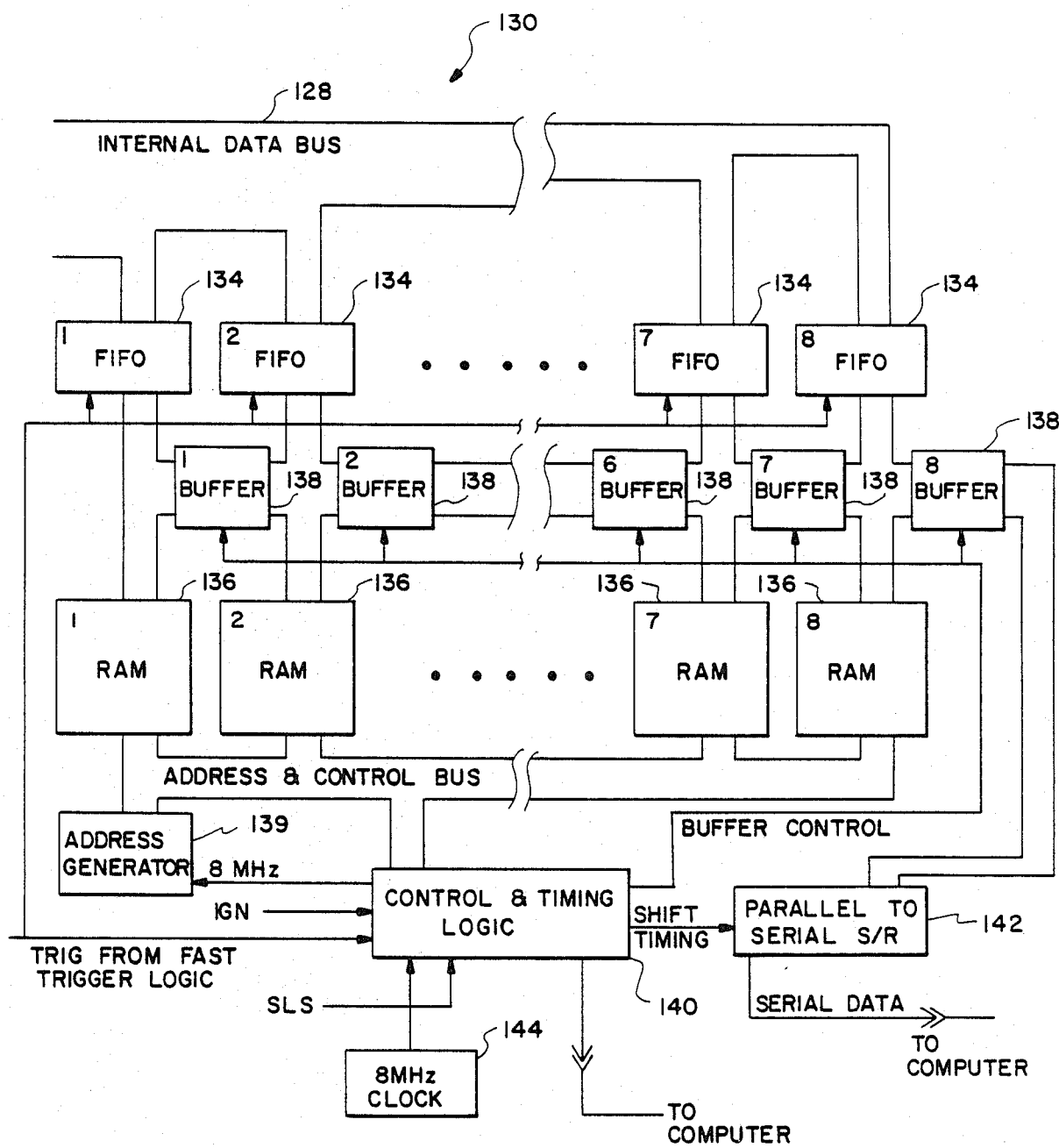
FIG. 16 is a block diagram of another data acquisition system.

FIG. 16 shows the block diagram of the data acquisition electronics 130. The data from the internal data bus 128 is read by a first-in-first-out (FIFO) buffer 134 to allow up to 150 microseconds of pretrigger data. When the projectile is sensed by the fast trigger logic (FTL) 132, the data is allowed to fill the RAM 136. After the RAM 136 is full, the control logic 140 halts data taking, opens the external data bus via buffers 138, and writes the data to a parallel-to-serial shift register 142 for transmission to an external computer.

The output data, from analog-to-digital converters 126 of FIG. 15, along the internal data base 128 are fed into the pre-trigger FIFO's 134 of FIG. 16 in the form of eight-bit words, i.e., four-bit words from two analog-to-digital converters 126, which are combined for each FIFO 134 input. FIFO's 134 hold 1024×9 bits and may be obtained from Integrated Device Technology of Santa Clara, Calif. Data from the internal data base 128 can be fed into FIFO's 134 continuously without the data going anywhere else. However, when FIFO's 134 receive a fast trigger logic signal, then the FIFO's 134 dump their existing data into corresponding 8K-bit RAM's 136. After the RAM's 136 are full, they stop taking data. One full line scan of data takes up 64 eight-bit bytes in either the pre-trigger FIFO's 134 or the RAM's 136. FIFO's 134 can take up to a maximum of sixteen line scans of data as a pretrigger period before they are full. Yet, since the fast trigger logic signal is asynchronous, they may hold fewer than sixteen line scans when the fast trigger logic signal, i.e., entry of projectile into electronic sensing screen 104 active area 105, indicates transfer of data into the RAM's 136. Therefore, data entry into RAM's 136 has to be held off until a new line scan is started in control and timing logic 140. The RAM's 136 can hold up to 128 line scans. After the RAM's 136 are full, the data can be read out and sent on to a computer or microcomputer.

The input ports of each of the RAM's 136 are also the output ports of the RAM's 136. Thus, when data are being taken out of RAM's 136, no data are being transferred into the RAM's 136. As data are being transferred out, the data go through buffers 138 onto the parallel-to-serial shift register 142 which takes the data and puts it into a strict serial format. This procedure of using the same port for both inputting and outputting data may be avoided with dual port RAM's.

The data from the parallel-to-serial shift register 142 are sent out to a microcomputer for data reduction and analysis. When data are to be taken out of RAM's 136, address generator 139 and buffers 138 receive signals to effect that transfer. The data from the RAM's 136 are sequenced out from one RAM 136 at a time, beginning from right to left in FIG. 16. For instance, on the far right, when RAM 136 has transferred all of its data through the far-right buffer 138 into the parallel-to-serial shift register 142, then data are taken out of the second from the right RAM 136 and are transferred through the second from the right buffer 138 and through the far-right buffer out onto the parallel-to-serial shift register 142, and so on, until one gets to the far-left RAM 136, data are transferred out of that RAM 136 through all the buffers 138 to the parallel-to-serial shift register 142. The reason for putting the data into strict serial format by shift register 142 is that this data may be transferred a great distance with more reliability than parallel transmission of such data. However, parallel transmission may be utilized for quicker transfer of data.

The address generator 139 consists of counters which count from 0 to 8 K, or so, for reading data from all of the FIFO's 134 into all of the RAM's 136, simultaneously. The address generator 139 also cycles the memory for reading out data out of each of the RAM's 136. However, in reading out, the RAM's 136 are addressed only one at a time. An 8 MHz clock 144, which is a basis for timing in the data acquisition system 130, feeds the clock signal into the control and timing logic 140 which passes on the 8 MHz clock signal to the address generator. When data are being read into RAM's 136, all the buffers 138 are off.

Figure 17:
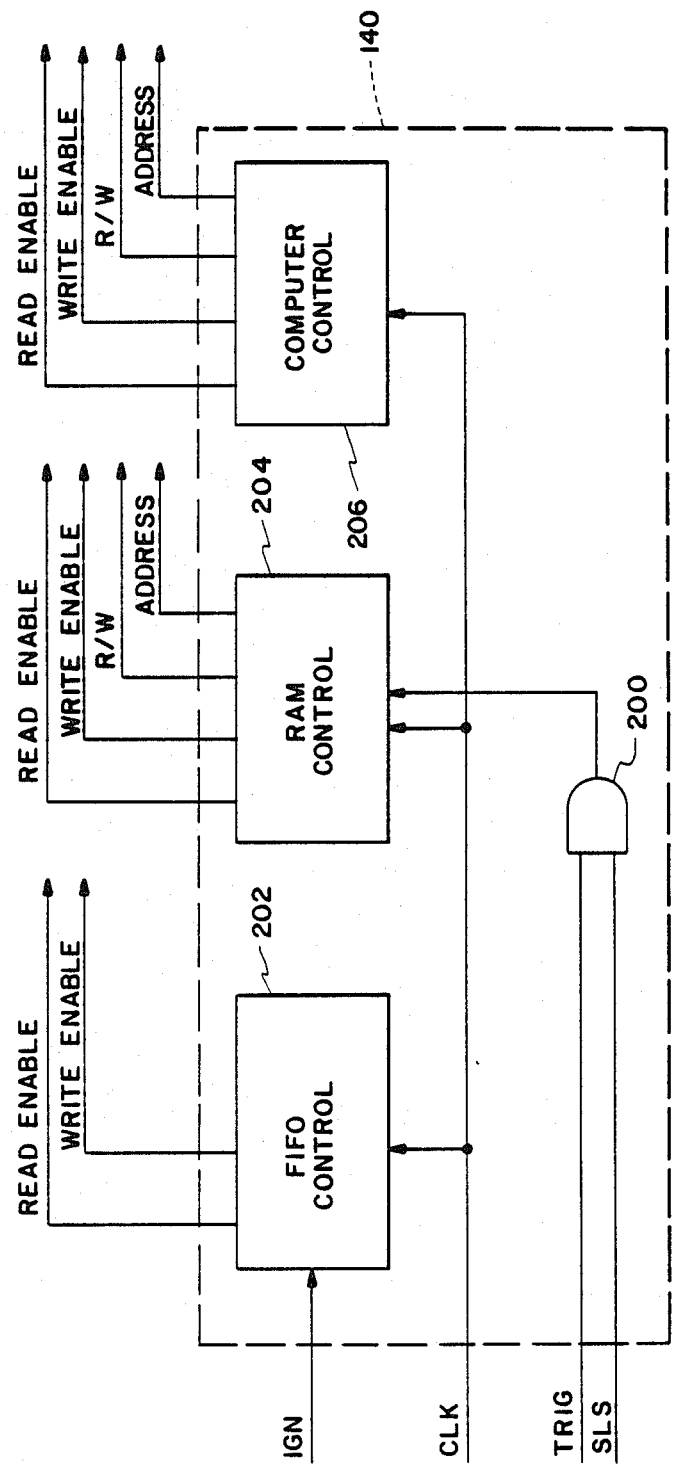
FIG. 17 shows the logic of timing and control of the other data acquisition system.

The timing and control logic 140 of FIGS. 16 and 17 has three basic functions: control of the FIFO's 134 read/write (R/W) function, control of the RAM's 136 R/W function, and control of the computer interface sequence. Each of these functions is initiated and kept in sequence by four control lines: the fast trigger logic (TRIG) pulse, the external projectile fire (IGN) pulse, the start line scan (SLS) pulse, and the 8 MHz clock (CLK) pulses.

The FIFO control block 202 generates a FIFO 134 read enable and toggles the R/W line at the internal data rate immediately upon receiving an IGN pulse. Data are taken until the pretrigger is satisfied, whereupon the FIFO 134 write enable is generated. Simultaneous reads and writes continue until a RAM 136 full signal is obtained. After the RAM 136 full is sensed, data taking is stopped.

The RAM control block 204 generates a RAM 136 read enable after receiving a simultaneous fast trigger logic (TRIG) signal and a start line scan (SLS) signal through AND gate 200, thus ensuring that no partial line scan data are taken. The RAM control block 204 is responsible for toggling the R/W line and address line appropriately during data taking. A RAM 136 full signal stops data taking, signals the external computer to start reading data, and transfers control to a computer control block 206.

The computer control block 206 is an interface with a computer or microcomputer. The computer control block 206 is initiated after a RAM 136 full signal is received. Block 206 is responsible for keeping the two-byte buffer in the parallel-to-serial shift register 142 filled with data to be sent to the external computer. To this end, the block 206 sequentially reads each RAM 136 (after enabling the appropriate buffers 138 used to isolate the eight separate RAM 136—FIFO 134 data buses) and writes this data to the parallel-to-serial shift register 142. Hand-shaking with the external computer is controlled by the parallel-to-serial shift register 142.

Figure 18:
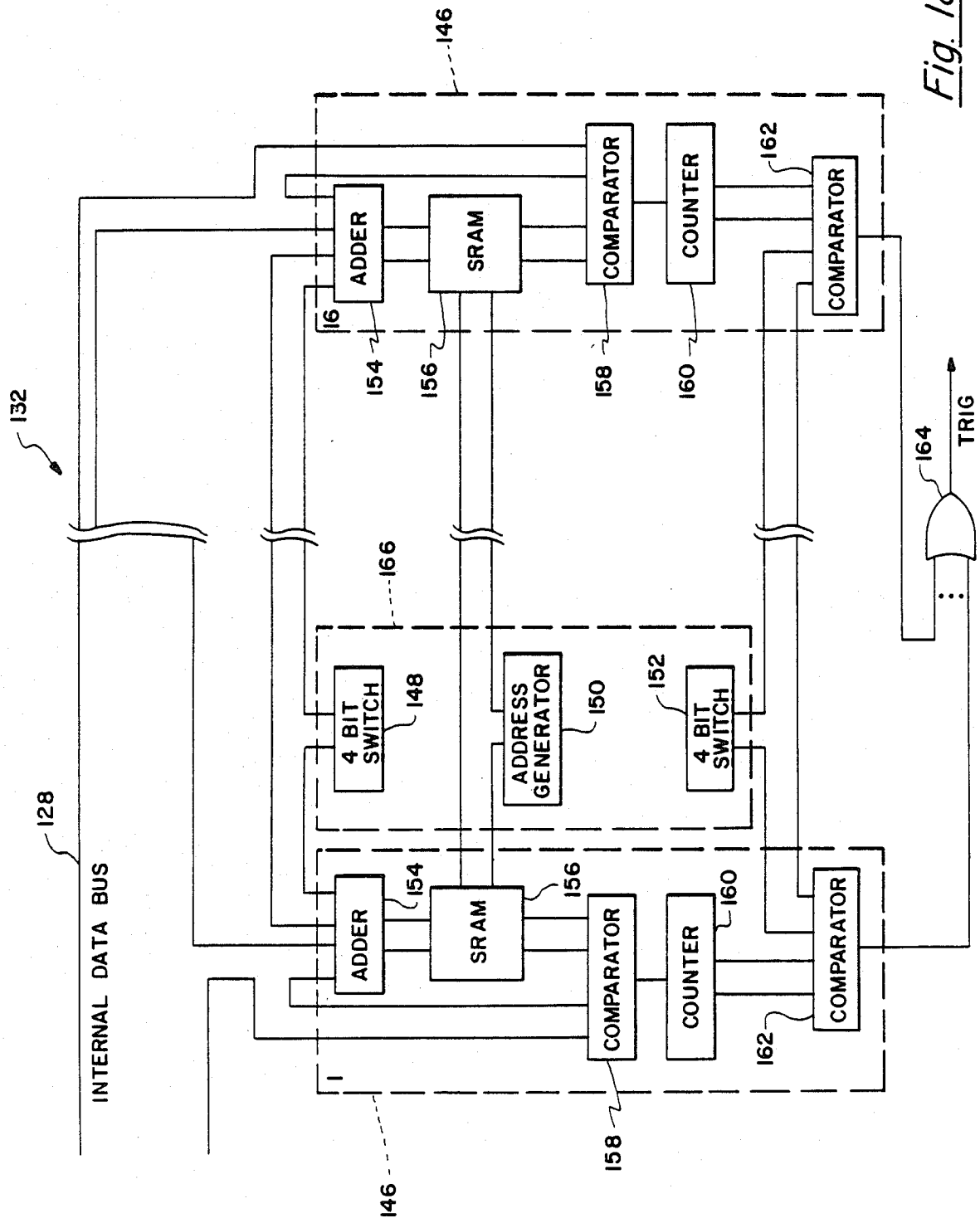
FIG. 18 shows another fast trigger logic configuration.

FIG. 18 shows a block diagram of a fast trigger logic 132 electronics. During the first 10 microsecond data cycle after the fire pulse is received (the IGN pulse), a digital value of each cell's charge storage (which is the measure of the light intensity reaching that cell), minus a preselected threshold, is stored in a small amount of memory. On each subsequent data cycle, the current cell intensity is compared to the stored threshold value and flagged if smaller. When the number of cells with the smaller intensity exceeds another preselected value, the trigger is satisfied. In this way, the fast trigger logic 132 in FIG. 18 is somewhat like an automatic gain control for ambient light conditions of the electronic sensing screen 104 apparatus. It measures the light conditions to determine if there is any change in them from one projectile firing to another. Constant light conditions are assumed during each projectile's travel time.

Fast trigger logic 132 obtains light intensity data from the internal data bus 128. The first line scan of photodiode array 118 of the electronic sensing screen 104 is used to determine the ambient light conditions. Four bits of data on existing light conditions come into adder 154 from data bus 128. To this value of four bits, adder 154 adds a certain preset value, such as a binary 1 or 2, from a four-bit switch 148 to each four-bit byte and stores the result in a static RAM 156. The four-bit switch 148 is a threshold preselect binary switch. Thus, the modified line scan is stored in the static RAM 156 with a slightly enhanced value of the ambient light conditions. That value of the light conditions is compared by a comparator 158 with another first line scan when the next projectile is fired. This procedure of evaluating merely the first line scan of a projectile firing, is made under the assumption, which is very likely, that by the time the projectile reaches the active area 105 from the moment it starts at the firing time, the ambient light conditions are likely to remain the same. However, since from one shot to the next shot there may be a change in the ambient light conditions, these conditions are checked every time a new projectile is fired.

The fast trigger logic 132 may be described in another manner. Address generator 150 of FIG. 18 generates an address for the static RAM 156, which is done once at the beginning of an ambient light check. On the next line scan, information comes in directly to the comparator 158 which compares the new value with the value in the static RAM 156 in terms of four binary bits. If the new value is lower, then the comparator 158 sets counter 160 and counts the number of cells that are lower than the "set value". What actually is happening is that the old data, i.e., the first line scan, are compared to the new data, i.e., the next line scan, and then the counter 160 just counts the number of cells that are lower and compares this counter value with another preset value from four-bit switch 152, which indicates the number of cells needed to be low, i.e., whatever value is selected, for presenting a fast trigger logic signal to OR gate 164.

Each of the two preselect switches 148 and 152, may be set to a four-bit binary number value. For instance, preselect switch 148 is the threshold switch for adding a certain value to the initial state of light conditions. The other preselect switch 152 tells how many pixels have to be lower than threshold level, or what number of cells have to be low, in order to create fast trigger logic signal to be sent to OR gate 164.

Overall, in the fast trigger logic circuit 132 of FIG. 18, there are 16 comparator-type circuits 146 which include adder 154, static RAM 156, comparator 158, counter 160 and comparator 162. The outputs of the circuits 146, i.e., coming out of the comparator 162, go into OR gate 164. When there is a signal from any of these circuits 146, OR gate 164 sends out a fast trigger logic signal (TRIG) which indicates that the projectile has entered the electronic sensing screen 104 active area 105. Circuit 166 in FIG. 18 consists of the threshold preselect switch 148, the preselect switch 152, and the address generator 150. There is only one circuit 166 and it is connected, in common, to all 16 circuits 146.

Figure 19:
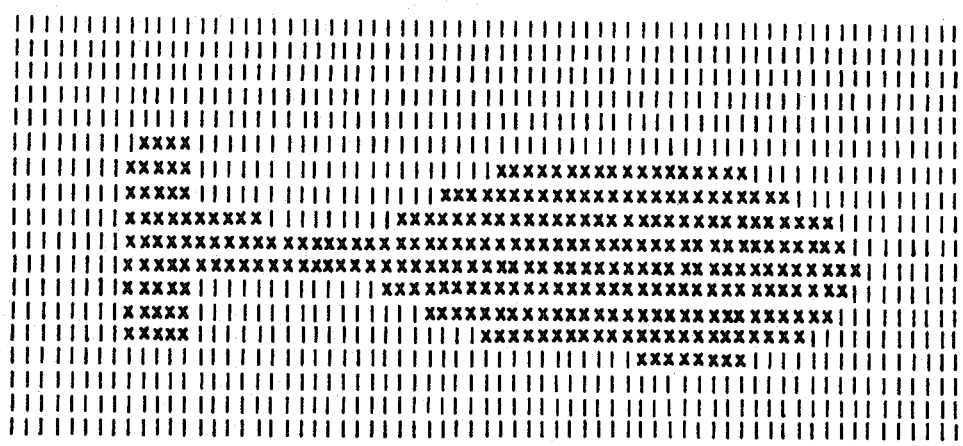
FIG. 19 is a printout of processed data of a simulated large projectile test.

FIG. 19 shows a printout of the data in graphic form of a projectile having passed through the electronic sensing screen 104 active area 105. After the extraction of the data from the invention, the data are then analyzed by a computer. FIG. 19 shows an example of how part of the raw data might appear for a projectile with tail boom and fins. For the purpose of this example, the projectile is assumed to be 40 inches long, travelling at 6560 feet per second with a 1° pitch angle and passing through the center of an active area defined by a 40 foot diameter circle. The cells which were obscured by the projectile passage appear as "asterisks" while the unobscured are "ones". This type of data pattern is called a "profile pattern". Another type of data pattern may provide shade information resulting in a photographic representation of the projectile. The velocity of the projectile can be obtained from one or both of two methods—directly from the profile pattern if the projectile length is known or, alternatively, via a "time of flight" determination between the two successive sensing grids.

Other parameters are obtainable. Dispersion is determined from a sequence of profiles for a series of projectile firings. Values of pitch and yaw can be computed from the profile "centers" at different positions along the shell, i.e., different times of data taking. However, all of the parameters are better determined with a computer which can fit the profile pattern to a model of the projectile shape stored in memory, and adjusting the parameters until the best fit is obtained. Such shape and profile fitting and comparison methods result in substantial improvement in accuracy. The computer can also correct the data for distortions due to projectile distance from the detector, optical opening angle and any known optical aberrations in the field of view.

Figure 20:
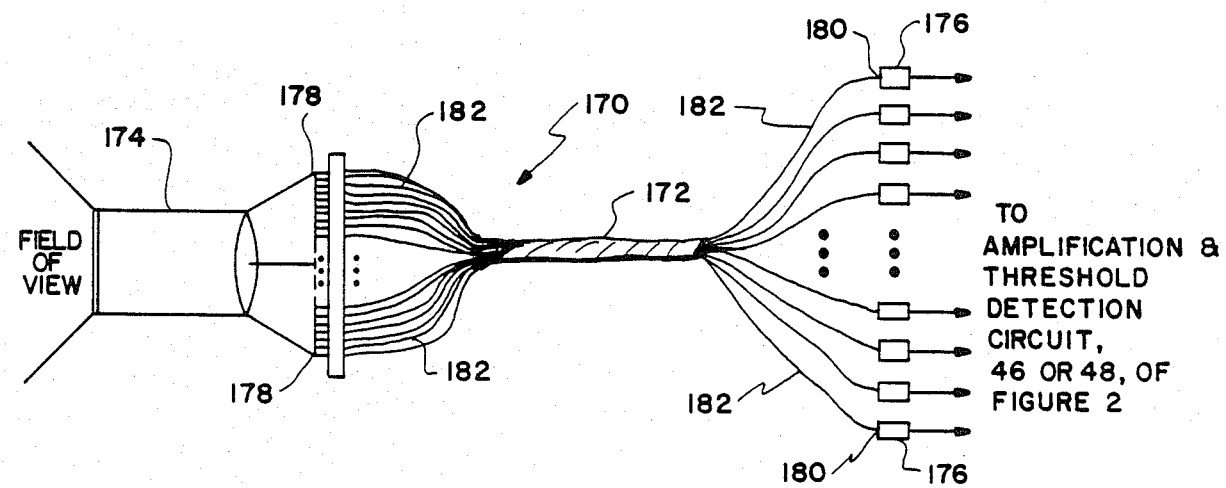
FIG. 20 shows a detector assembly having fiber optics.

A third embodiment is similar to the second embodiment, by utilizing two electronic sensing screens 104 composing active area 105 within which projectile parameters are measured. The third embodiment is similar to the first embodiment by utilizing the same electronics. The unique feature of the third embodiment is the detector assembly as shown in FIG. 20. It utilizes a fiber optics bundle 172 to convey image data from the optics 174 to PIN photodiode 176. Fiber ends 178, upon which an image is focused, are next to each other in a colinear fashion. The fibers may be as small as 125 microns, so that 1000 strands can form a flat cable of only 12.5 cm wide. The other flat ends 180 of the fiber 182 of the fiber optics cable 172, are each coupled to a PIN photodiode 176. The output of each photodiode 180 goes to the amplification and threshold detection circuit 46 or 48. The great advantage is that this detector-amplifier combination at the end of each fiber 180 can be made as sensitive as necessary to achieve the necessary data-sensing characteristics.

This embodiment avoids the problems of the second embodiment in situations where environmental light conditions impose unacceptable long integration time requirements on the CCD detector array 118 of FIG. 15, by allowing essentially instantaneous transfer of data regarding the light level at any point in the field of view illustrated in FIG. 14. The third embodiment avoids the requirements of special light sources of the first embodiment by avoiding the problems of noise and "cross-talk" of adjacent photodiodes needing to be sensitive to low intensity light variations under natural ambient light conditions of the environment.

Figure 21:
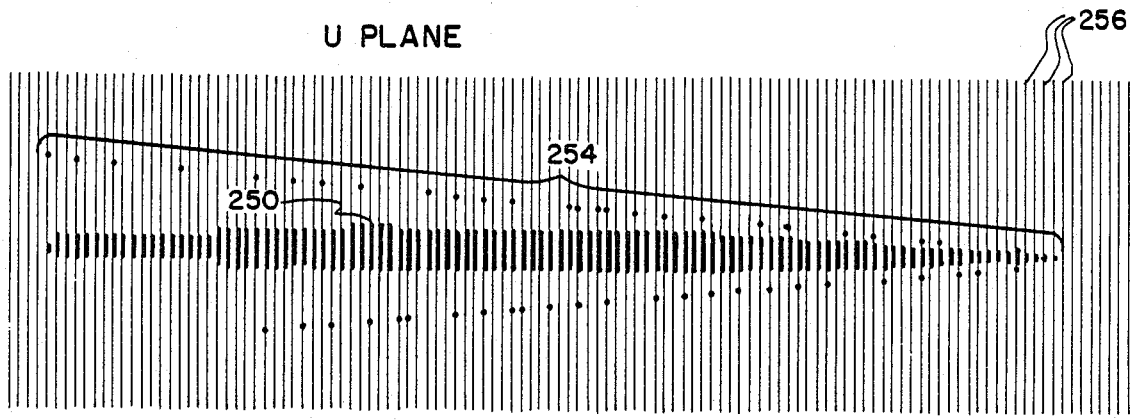
FIGS. 21 and 22 show results of an actual projectile test from different planar views, respectively.
Figure 22:
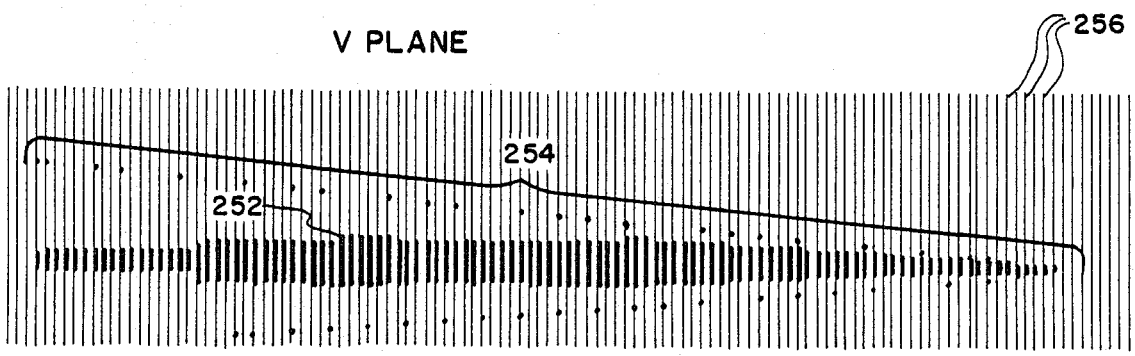

FIGS. 21 and 22 show the actual results of a projectile test with the first described embodiment of the present invention. The set of data in FIG. 21 shows a profile 250 of the tested projectile as viewed by the U plane sensor. FIG. 22 shows a profile 252 of the same projectile as viewed by the V plane sensor. The horizontal axis in FIGS. 21 and 22 represents the line scan time (one line per microsecond) and the vertical axis represents a pixel location.

Points 254 depict the projectile's shock wave in each plane, which can be measured simultaneously with other parameters of the tested projectile. The density of the shock wave pixels is proportional to the threshold settings at the time of firing of the projectile, and so can be made more or less visible as described. ·

All the projectile parameters that the invention was designed to measure were actually measured to the predicted high precision. The results were compared with other measurement methods, excluding the present invention, within estimated errors. The speed of the projectile as measured by the invention was determined to be within one percent; pitch and yaw within one milliradian; and dispersion, i.e., locations of target impacts, within one-half millimeter.

Excellent reliability of the invention was demonstrated by the testing. The invention was insensitive to environmental conditions normally encountered in the field as ell as shock effects from repeated gun firings.

The embodiments of the invention in which an exclusive property or right is claimed are defined as follows:

1. An electronic sensing apparatus, for measuring various parameters of moving projectiles, comprising:
   detecting means for establishing a field of view and for detecting radiation and said radiation is occluded when said moving projectiles pass between a source of said radiation and said means for detecting said radiation, comprising:
   a photocell array; and
   a fiber optics assembly connected to said photocell array;
   processing means, connected to said detecting means, for processing detection signals, comprising:
   converting means, connected to said detecting means, for converting detected radiation into signals indicative of said moving projectiles;
   storage means, connected to said converting means, for storing said detection signals;
   timing means, connected to said detecting means, to said converting means and to said storage means, for providing a clock signal;
   fast trigger logic means, connected to said timing means and to said converting means, for providing a trigger signal; and
   computing means, connected to said storage means, for computing said detection signals.

2. Apparatus according to claim 1 wherein said computing means comprises a computer for computing various parameters from said signals, such as speed, dispersion, pitch, yaw, and shape of said moving projectiles, by comparingimage and timing data to a computer-constructed model image of a projectile via a mathematical comparison method.

3. Apparatus according to claim 1 further comprising display means for displaying computed parameters of said moving projectiles.

4. Apparatus according to claim 1 wherein said storage means further comprises a storage memory means for receiving and storing said electronic signals from said first-in-first-out memory means.

5. Apparatus according to claim 1 wherein said source of radiation is the sun.

6. Apparatus according to claim 5 wherein said detecting means comprises:
   a first radiation detector; and
   a second radiation detector located a distance from said first radiation detector.

7. Apparatus according to claim 5 wherein said detecting means comprises a receptor array means for detecting sunlight from said sun and for converting said detected sunlight into electronic analog signals.

8. Apparatus according to claim 7 wherein said converting means comprises an analog-to-digital converter means for converting said electronic analog signals into electronic digital signals.

9. Apparatus according to claim 8 wherein said electronic digital signals represent only discrete values of black and white.

10. Apparatus according to claim 8 wherein said electronic digital signals represent various shades of gray and discrete values of black and white.

11. Apparatus according to claim 10 wherein said converting means comprises a first-in-first-out memory means for receiving and holding said electronic digital signals from said analog-to-digital converter means.

12. Apparatus according to claim 1 further comprising a source of radiation.

13. Apparatus according to claim 12 wherein said source of radiation emits laser light.

14. Apparatus according to claim 12 wherein said source of radiation comprises a means for collimating light.

15. Apparatus according to claim 12 wherein said source of radiation comprises a light transmitting means for transmitting laser light in two parallel but separate planes having the directions of the light in the respective planes approximately perpendicular to each other.

16. Apparatus according to claim 15 wherein said detecting means comprises receptor means for detecting said laser light from said light transmitting means, and for converting said detected laser light into electronic analog signals.

17. Apparatus according to claim 16 wherein said converting means comprises an amplification and threshold detection means for amplifying and threshold detecting said electronic analog signals from said receptor means for conversion to electronic digital signals.

18. Apparatus according to claim 17, wherein said converting means comprises a logic circuit latch means for temporarily holding said electronic digital signals from said amplification and threshold detection means.

19. Apparatus according to claim 18, wherein said storage means further comprises a first-in-first-out buffer memory means for receiving and holding said electronic digital signals from said logic circuit latch means.

20. Apparatus according to claim 19, wherein said storage means further comprises a storage memory means for receiving and storing said electronic digital signals from said first-in-first-out buffer memory means.

21. Apparatus according to claim 20 wherein said computing means further comprises a computer for receiving electronic digital signals from said storage memory means and computing from said electronic digital signals, various parameters, such as speed, dispersion, pitch, yaw, and shape of said moving projectiles.

22. Apparatus according to claim 20 wherein said processing means comprises a timing means for providing a clock signal to said logic circuit latch means, said first-in-first-out buffer memory means, and said storage memory means.

23. Apparatus according to claim 22 wherein said processing means comprises a fast trigger logic means for providing a trigger start signal to said logic circuit latch means, said first-in-first-out buffer memory means, and a memory enable signal to said storage memory means.

24. An electronic sensing apparatus, for measuring various parameters of moving projectiles, comprising:
   a first laser light means for emitting a first laser light;
   a first light transmitting means for transmitting said first laser light in a first thin plane approximately orthogonal to direction of said moving projectiles;
   a second laser light means for emitting a second laser light;
   a second light transmitting means for transmitting said second laser light in a second thin plane approximately orthogonal to direction of said moving projectiles and approximately parallel to and proximate to said first thin plane and having said second laser light in a direction approximately perpendicular to the direction of said laser light;
   a first receptor array means for detecting said first laser light from said first light transmitting means and converting said detected first laser light into a first set of electronic analog signals;
   a second receptor array means for detecting said second laser light from said second light transmitting means and converting said detected second laser light into a second set of electronic analog signals;
   a first amplification and threshold detection means for amplifying and threshold detecting said first set of electronic analog signals from said first receptor array means, for conversion into a first set of electronic digital signals, and a second amplification and threshold detecting means for amplifying and threshold detecting said second set of electronic analog signals from said second receptor array means, for conversion into a second set of electronic digital signals;
   a first logic circuit latch means for temporarily holding said first set of electronic digital signals from said first amplification and threshold detection means, and a second logic circuit latch means for temporarily holding said second set of electronic digital signals from said second amplification and threshold detection means;
   a first-in-first-out buffer memory means for receiving and holding said first and second sets of electronic digital signals from said first and second logic circuit latch means;
   a storage memory means for receiving and storing said first and second sets of electronic digital signals from said first-in-first-out buffer memory means;
   an oscillator and timer means for providing a clock signal to said first and second logic circuit latch means, said first-in-first-out buffer memory means, and said storage memory means; and
   a fast trigger logic means for providing a trigger start signal to said first and second logic circuit latch means, said first-in-first-out buffer memory means, and a memory enable signal to said storage memory means.

25. Apparatus according to claim 24 wherein said electronic digital signals represent only discrete values of black and white.

26. Apparatus according to claim 24 wherein said electronic digital signals represent various shades of gray and discrete values of black and white.

27. Apparatus according to claim 26 further comprising:
   a computer means for receiving said first and second sets of electronic digital signals from said storage memory means and for computing various parameters, such as speed, dispersion, pitch, yaw and shape of said moving projectiles.

28. Apparatus according to claim 24 wherein said first receptor array means comprises a fiber optics assembly.

29. Apparatus according to claim 28 wherein said second receptor array means comprises a fiber optics assembly.

30. A method for measuring various parameters of moving projectiles, comprising:
   detecting radiation and said radiation is occluded when said moving projectiles pass by;
   converting detected radiation into electronic signals;
   providing a fast trigger signal when said radiation is first occluded;
   storing, upon receipt of the fast trigger signal, said electronic signals in a first-in-first-out manner;
   computing from said electronic signals, various parameters of said moving projectiles; and
   displaying said various parameters of said moving projectiles.

31. Method according to claim 30 further comprising a step of providing said radiation.

32. Method according to claim 31 wherein said step for providing radiation further comprises collimating said radiation.

33. An electronic sensing apparatus, for measuring various parameters of moving projectiles, utilizing natural or ambient radiation, comprising:
   first detector means, having a first field of view located at a first position, for detecting said radiation and detecting occlusions of said radiation in said first field of view wherein said occlusions are caused by said moving projectiles passing through said first field of view;
   second detector means, having a second field of view located at a second position, for detecting said radiation and detecting occlusions of said radiation in said second field of view wherein said occlusions are caused by said moving projectiles passing through said second field of view; and
   processing means, connected to said first and second detector means, for processing information from said first and second detectors into at least one parameter, such as speed, dispersion, pitch, yaw, or shape, of said moving projectiles.

34. Apparatus of claim 33 wherein:
   said first detector means outputs a first set of electronic analog signals containing information about detecting said radiation and detecting occlusions of said radiation;

said second detector means outputs a second set of electronic analog signals containing information about detecting said radiation and detecting occlusions of said radiation;

said first field of view has an approximate form of a plane approximately perpendicular to a direction of said moving projectiles; and said second field of view has an approximate form of a plane approximately perpendicular to the direction of said moving projectiles.

35. Apparatus of claim 34 wherein said processing means comprises:

first amplification and threshold detection means for amplifying and threshold detecting said first set of electronic analog signals from said first detector means, for conversion into a first set of electronic digital signals, and a second amplification and threshold detecting means for amplifying and threshold detecting said second set of electronic analog signals from said second detector means, for conversion into a second set of electronic digital signals;

first logic circuit latch means for temporarily holding said first set of electronic digital signals from said first amplification and threshold detection means, and a second logic circuit latch means for temporarily holding said second set of electronic digital signals from said second amplification and threshold detection means;

first-in-first-out buffer memory means for receiving and holding said first and second sets of electronic digital signals from said first and second logic circuit latch means;

storage memory means for receiving and storing said first and second sets of electronic digital signals from said first-in-first-out buffer memory means;

oscillator and timer means for providing a clock signal to said first and second logic circuit latch means, said first-in-first-out buffer memory means, and said storage memory means;

fast trigger logic means for providing a trigger start signal to said first and second logic circuit latch means, said first-in-first-out buffer memory means, and a memory enable signal to said storage memory means; and computer means for receiving said first and second sets of electronic digital signals from said storage memory means and for computing various parameters, such as speed, dispersion, pitch, yaw and shape of said moving projectiles.

* * * * *